(12) United States Patent
Paladugu et al.

(10) Patent No.: US 11,812,512 B2
(45) Date of Patent: Nov. 7, 2023

(54) DETECTING A CHANGE TO RELAY DEVICE PROTOCOL DATA UNIT SESSION CONFIGURATION

(71) Applicant: QUALCOMM Incorporated, San Diego, CA (US)

(72) Inventors: Karthika Paladugu, San Diego, CA (US); Hong Cheng, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 17/395,354

(22) Filed: Aug. 5, 2021

(65) Prior Publication Data
US 2023/0039791 A1 Feb. 9, 2023

(51) Int. Cl.
*H04W 80/10* (2009.01)
*H04W 76/22* (2018.01)
*H04W 88/04* (2009.01)

(52) U.S. Cl.
CPC .......... *H04W 80/10* (2013.01); *H04W 76/22* (2018.02); *H04W 88/04* (2013.01)

(58) Field of Classification Search
CPC ...... H04W 80/10; H04W 76/22; H04W 88/04
See application file for complete search history.

(56) References Cited

U.S. PATENT DOCUMENTS

| 11,082,894 B2* | 8/2021 | Marquezan | H04W 36/0027 |
| 2019/0313276 A1* | 10/2019 | Huang-Fu | H04W 76/22 |
| 2020/0170055 A1* | 5/2020 | Dou | H04W 64/003 |
| 2020/0260325 A1* | 8/2020 | Futaki | H04W 76/22 |
| 2020/0323028 A1* | 10/2020 | Huang-Fu | H04W 36/14 |

(Continued)

FOREIGN PATENT DOCUMENTS

WO 2021045859 A1 3/2021

OTHER PUBLICATIONS

"3rd Generation Partnership Project, Technical Specification Group Services and System Aspects, Proximity based Services (ProSe) in the 5G System (5GS) (Release17)", 3GPP Standard, Technical Specification, 3GPP TS 23.304, 3rd Generation Partnership Project, Mobile Competence Centre, 650, Route Des Lucioles, F-06921 Sophia-Antipolis Cedex, France, No. V1.0.0, Jun. 4, 2021, pp. 1-90, XP052029420, cited in the application sections 5 and 6, in particular subsections 6.3-6.6.

(Continued)

*Primary Examiner* — Will W Lin
(74) *Attorney, Agent, or Firm* — Arun Swain

(57) ABSTRACT

Aspects relate to a relay device detecting a change in a protocol data unit (PDU) session configuration that the relay device has established for a user equipment (UE) that accesses a network via the relay device. Upon detecting this change, the relay device signals an indication of the change to the UE. Aspects also relate to UE that is connected to a relay device and that reselects an interworking function (e.g., a non-3$^{rd}$ Generation Partnership Project interworking function (N3IWF)). In some examples, the UE receives an indication from the relay device that a serving relay PDU session configuration has changed and, in response, the UE selects a new interworking function.

46 Claims, 17 Drawing Sheets

(56) References Cited

U.S. PATENT DOCUMENTS

| | | | | |
|---|---|---|---|---|
| 2021/0227455 | A1* | 7/2021 | Aramoto | H04W 48/18 |
| 2021/0235517 | A1* | 7/2021 | Won | H04W 76/10 |
| 2021/0314824 | A1* | 10/2021 | Keller | H04W 76/34 |
| 2022/0022089 | A1* | 1/2022 | Zhu | H04W 28/0268 |
| 2022/0039181 | A1* | 2/2022 | Kim | H04W 40/04 |
| 2022/0124549 | A1* | 4/2022 | Yang | H04W 28/0268 |
| 2022/0141898 | A1* | 5/2022 | Kim | H04W 76/14 370/315 |
| 2022/0191165 | A1* | 6/2022 | Zhu | H04W 48/18 |
| 2022/0279348 | A1* | 9/2022 | Youn | H04W 8/20 |
| 2022/0287116 | A1* | 9/2022 | Kim | H04W 76/12 |
| 2022/0322135 | A1* | 10/2022 | Xu | H04W 12/08 |
| 2022/0322202 | A1* | 10/2022 | Li | H04M 15/8016 |
| 2022/0338000 | A1* | 10/2022 | Lee | H04W 12/06 |
| 2022/0353799 | A1* | 11/2022 | Talebi Fard | H04W 8/005 |
| 2022/0369215 | A1* | 11/2022 | Dees | H04W 76/12 |
| 2022/0377598 | A1* | 11/2022 | Pan | H04W 28/0273 |
| 2023/0023639 | A1* | 1/2023 | Shi | H04W 8/005 |

OTHER PUBLICATIONS

"3rd Generation Partnership Project, Technical Specification Group Services and System Aspects, Study on System Enhancement for Proximity Based Services (ProSe) in the 5G System (5GS) (Release 17)", 3GPP Standard, Technical Report, 3GPP TR 23.752, 3rd Generation Partnership Project (3GPP), Mobile Competence Centre, 650, Route Des Lucioles, F-06921 Sophia-Antipolis Cedex, France, vol. SA WG2, No. V17.0.0, Mar. 31, 2021, pp. 1-183, XP052000261, section 6, in particular subsections 6.23-6.26, 6.45.
International Search Report and Written Opinion—PCT/US2022/036311—ISA/EPO—dated Sep. 23, 2022.
Qualcomm Incorporated, et al., "Kl#3, Sol#23: Update N3IWF Selection for Layer-3 UE-to-Network Relay", SA WG2 Meeting #140E (e-meeting), S2-2008282, 3rd Generation Partnership Project, Mobile Competence Centre, 650, Route Des Lucioles, F-06921 Sophia-Antipolis Cedex, France, vol. SA WG2, No. E (e-meeting), Elbonia, Aug. 19, 2020-Sep. 1, 2020, Oct. 25, 2020, 9 Pages, XP051948347, sections 1-3.

* cited by examiner

DETECTING A CHANGE TO RELAY DEVICE PROTOCOL DATA UNIT SESSION CONFIGURATION

TECHNICAL FIELD

The technology discussed below relates generally to wireless communication and, more particularly, to detecting a change to a protocol data unit (PDU) session configuration of a relay device and actions taken in response to this change.

INTRODUCTION

Wireless communication between devices may be facilitated by various network configurations. In one configuration, a cellular network may enable wireless communication devices to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, the disclosure provides a wireless communication relay device that includes a transceiver, a memory, and a processor communicatively coupled to the transceiver and the memory. The processor and the memory may be configured to establish a protocol data unit session for a user equipment to access an interworking function via the transceiver and transmit a first indication of a change in a protocol data unit session configuration for the protocol data unit session to the user equipment via the transceiver.

In some examples, the disclosure provides a method for wireless communication at a wireless communication relay device. The method may include establishing a protocol data unit session for a user equipment to access an interworking function and transmitting a first indication of a change in a protocol data unit session configuration for the protocol data unit session to the user equipment.

In some examples, the disclosure provides a wireless communication relay device. The wireless communication relay device may include means for establishing a protocol data unit session for a user equipment to access an interworking function and means for transmitting a first indication of a change in a protocol data unit session configuration for the protocol data unit session to the user equipment.

In some examples, the disclosure provides an article of manufacture for use by a wireless communication relay device. The article of manufacture may include a computer-readable medium having stored therein instructions executable by one or more processors of the wireless communication relay device to establish a protocol data unit session for a user equipment to access an interworking function and transmit a first indication of a change in a protocol data unit session configuration for the protocol data unit session to the user equipment.

In some examples, the disclosure provides a user equipment that includes a transceiver, a memory, and a processor communicatively coupled to the transceiver and the memory. The processor and the memory may be configured to connect via the transceiver to a first interworking function via a relay device protocol data unit session and connect via the transceiver to a second interworking function in response to a detection of a change in a protocol data unit session configuration for the relay device protocol data unit session.

In some examples, the disclosure provides a method for wireless communication at a user equipment. The method may include connecting to a first interworking function via a relay device protocol data unit session and connecting to a second interworking function in response to detecting a change in a protocol data unit session configuration for the relay device protocol data unit session.

In some examples, the disclosure provides a user equipment. The user equipment may include means for connecting to a first interworking function via a relay device protocol data unit session and means for connecting to a second interworking function in response to detecting a change in a protocol data unit session configuration for the relay device protocol data unit session.

In some examples, the disclosure provides an article of manufacture for use by a user equipment. The article of manufacture may include a computer-readable medium having stored therein instructions executable by one or more processors of the user equipment to connect to a first interworking function via a relay device protocol data unit session and connect to a second interworking function in response to a detection of a change in a protocol data unit session configuration for the relay device protocol data unit session.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
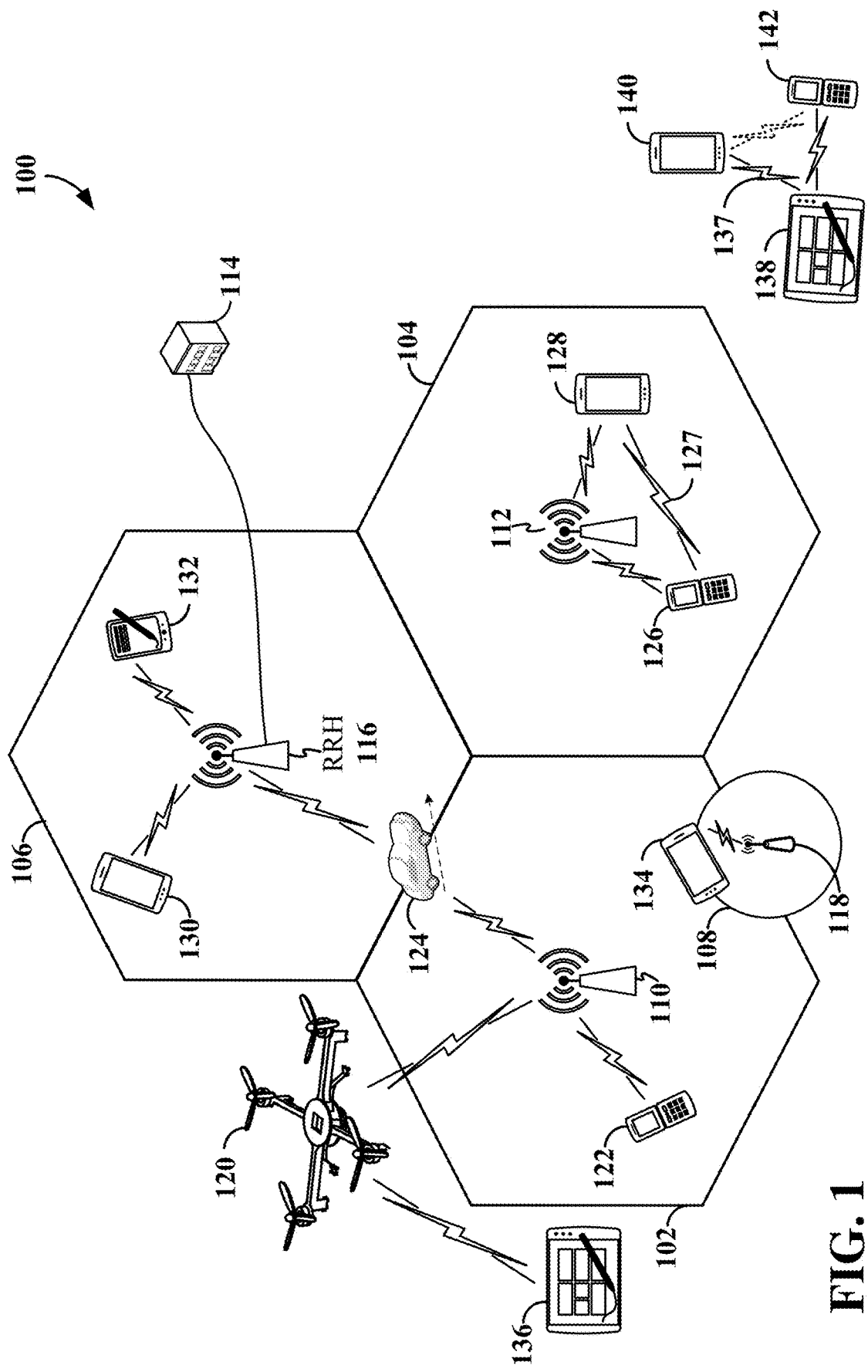
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to a relay device detecting a change in a protocol data unit (PDU) session configuration for a PDU session that the relay device has established for a remote device (e.g., a user equipment that gains access to the network via the relay device). Upon detecting the change in the PDU session configuration, the relay device signals an indication of the change to the remote device.

Various aspects of the disclosure relate to a user equipment that is connected to a relay device and that reselects an interworking function (e.g., a non-$3^{rd}$ Generation Partnership Project interworking function (N3IWF)) under certain conditions. In some examples, the user equipment receives an indication from the relay device that a serving relay PDU session configuration has changed and, in response, the user equipment selects a new interworking function. In some examples, the user equipment determines that it can no longer access an interworking function and, in response, the user equipment selects a new interworking function.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station (e.g., the UAV 120). Here, each base station 110, 112, 114, 118, and the UAV 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelink signaling 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication.

The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
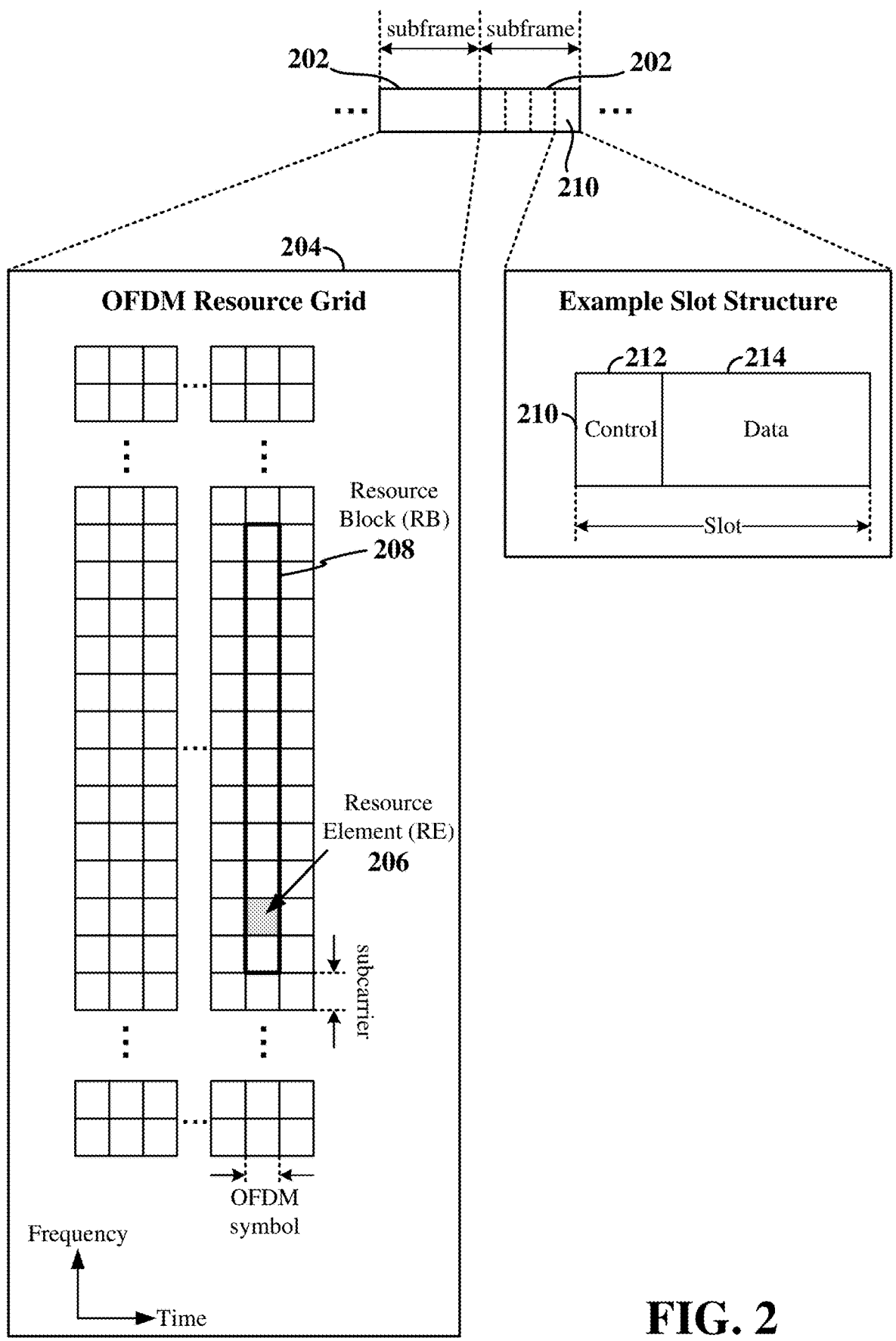
FIG. 2 is a schematic diagram illustrating organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a proximity service (ProSe) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
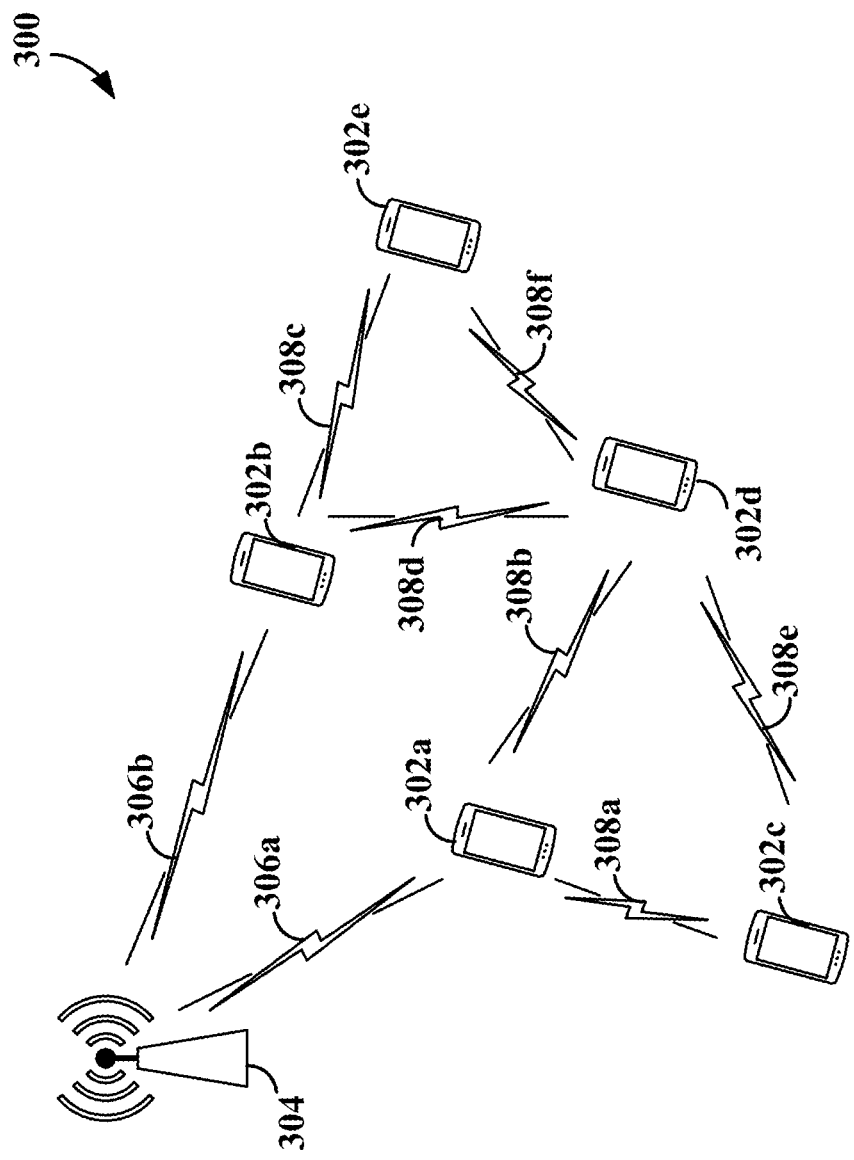
FIG. 3 is a diagram illustrating an example of a wireless communication network employing sidelink communication according to some aspects.

FIG. 3 is a diagram illustrating an exemplary wireless communication network 300 employing D2D or sidelink relaying. The wireless communication network 300 may correspond, for example, to the RAN 100 illustrated in FIG. 1. The wireless communication network 300 may include a network entity 304 (e.g., a base station, eNB, or gNB) in wireless communication with one or more wireless communication devices (e.g., UEs 302a, 302b, 302c, 302d, and 302e). In the example shown in FIG. 3, the network entity 304 may communicate with at least UEs 302a and 302b via a respective Uu wireless communication link 306a and 306b. In some examples, the network entity 304 may further have a Uu link with one or more of remote UEs (e.g., UEs 302c, 302d, and/or 302e). Each of the Uu wireless communication links 306a and 306b may utilize a sub-6 GHz carrier frequency or a mmWave carrier frequency. In some examples, one or more UEs (e.g., UEs 302c, 302d, and 302d) may not have a Uu connection with the network entity 304.

In addition, respective D2D relay links 308a-308f (e.g., sidelinks) may be established between various UEs to enable relaying of information between the network entity 304 and one or more remote UEs, such as the UEs 302c-302e, or between a remote UE (e.g., the UE 302e) and a destination UE (e.g., the UE 302c). For example, the relay link 308a may be established between the UE 302c and the UE 302a, the relay link 308b may be established between the UE 302d and the UE 302a, the relay link 308c may be established between the UE 302e and the UE 302b, the relay link 308d may be established between the UE 302d and the UE 302b, the relay link 308e may be established between the UE 302c and the UE 302d, and the relay link 308f may be established between the UE 302d and the UE 302e. Each relay link 308a-308f may utilize, for example, decode and forward (DF) relaying, amplify and forward (AF) relaying, or compress and forward (CF) relaying. For DF relaying, HARQ feedback may be provided from the receiving device to the transmitting device. The sidelink communication over the relay links 308a-308d may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

The relay links 308a-308f may be established due to, for example, distance or signal blocking between the network entity 304 (or destination UE) and a remote UE (e.g., the UE 302e), weak receiving capability of the remote UE, low transmission power of the remote UE, limited battery capacity of the remote UE, and/or to improve link diversity. Thus, the relay links 308a-308f may enable communication between the network entity 304 and a remote UE (e.g., the UE 302e) to be relayed via one or more relay UEs (e.g., the UEs 302a-302d) over the Uu wireless communication links 306a and 306b and the relay links 308a-308f. In other examples, the relay links 308a-308f may enable sidelink communication to be relayed between a remote UE 302e and another destination UE (e.g., the UE 302c) over various relay links.

In some examples, the relay links 308a-308f may utilize a ProSe PC5 interface for sidelink communication between the UEs 302a-302e. To facilitate D2D sidelink communication between, for example, the UEs 302a and 302c over a sidelink (e.g., the relay link 308a), the UEs 302a and 302c may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink (e.g., the relay link 308a). For example, the discovery signal may be utilized by the UE 302c to measure the signal strength and channel status of a potential sidelink (e.g., the relay link 308a) with another UE (e.g., the UE 302a). The UE 302c may utilize the measurement results to select a UE (e.g., the UE 302a) for sidelink communication or relay communication.

In some examples, a common carrier may be shared between the relay links 308a-308f and the Uu wireless communication links 306a and 306b, such that resources on the common carrier may be allocated for both sidelink communication between the UEs 302a-302e and cellular communication (e.g., uplink and downlink communication) between the UEs 302a-302e and the network entity 304. In addition, in a 5G NR sidelink deployment, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., the network entity 304).

In addition, there may be two main resource allocation modes of operation for sidelink (e.g., PC5) communication. In a first mode, Mode 1, the network entity 304 (e.g., a gNB) may allocate resources to sidelink devices (e.g., the UEs 302a-302e) for sidelink communication between the UEs 302a-302e in various manners. For example, the network entity 304 may allocate sidelink resources dynamically (e.g., a dynamic grant) to the UEs 302a-302e, in response to requests for sidelink resources from the UEs 302a-302e. The network entity 304 may further activate preconfigured sidelink grants (e.g., configured grants) for sidelink communication among the UEs 302a-302e. In Mode 1, sidelink feedback (sidelink HARQ feedback) may be reported back to the network entity 304. For example, the UE 302a may transmit sidelink HARQ feedback received from the UE 302c to the network entity 304.

In a second mode, Mode 2, the UEs 302a-302e may autonomously select sidelink resources for sidelink communication therebetween. In some examples, a transmitting UE (e.g., the UE 302a) may perform resource/channel sensing to select resources (e.g., sub-channels) on the sidelink channel that are unoccupied. Signaling on the sidelink is the same between the two modes. Therefore, from a receiver's point of view, there is no difference between the modes.

A remote UE (e.g., the UE 302d) may generally connect to a source relay UE (e.g., the UE 302a) via a layer 3 (L3) connection with no Uu connection with (and no visibility to) the network or via a layer 2 (L2) connection where the remote UE supports Uu access stratum (AS) and non-AS (NAS) connections with the network. When there is no direct connection path (Uu connection) between the remote UE and the network entity (e.g., an L3 connection), the remote UE is connected to the relay UE via a PC5 connection only (e.g., Layer 3 UE-to-NW). In this example, the relay UE may report to the 5G core network (5GC) about the remote UE's presence. In other examples, the remote UE may be visible to the 5GC via a non-3GPP interworking function (N3IWF) as discussed below.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel SCI-1 may also include information about SCI-2. For example, SCI-1 may disclose the format of SCI-2. In some examples, the format may indicate the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for a NACK. SCI-2 may include other information that is useful for establishing and decoding a PSSCH resource.

Figure 4:
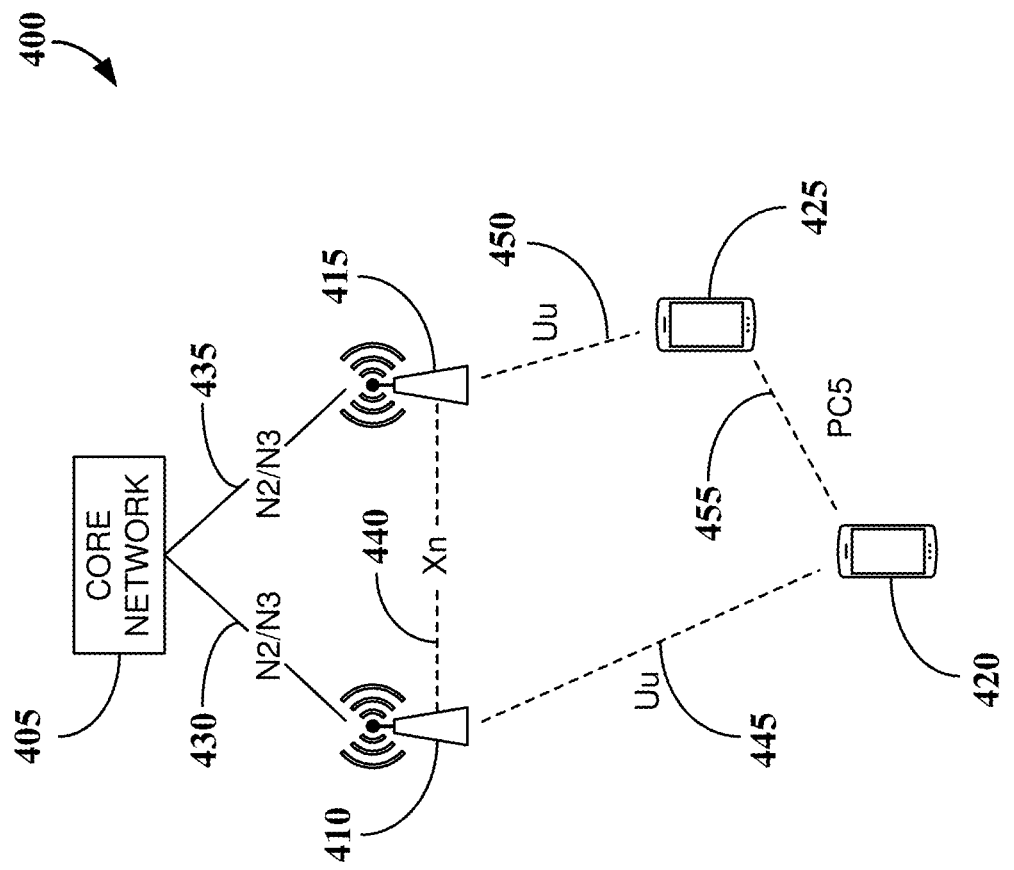
FIG. 4 is a diagram illustrating a wireless communication system supporting remote wireless communication device communication to a network via at least one relay wireless communication device according to some aspects.

FIG. 4 is a block diagram illustrating a wireless communication system 400 supporting remote wireless communication device communication to a network via at least one relay wireless communication device according to some aspects. The wireless communication system 400 includes a remote wireless communication device 420 (e.g., a UE), a relay wireless communication device 425 (e.g., a UE), a first base station 410 (e.g., a gNB), a second base station 415 (e.g., a gNB), and a core network 405 (e.g., a 5G NR network).

The remote wireless communication device 420 may be communicatively coupled to the first base station 410 via a cellular link 445 (e.g., Uu). Similarly, the relay wireless communication device 425 may be communicatively coupled to the second base station 415 via a cellular link 450 (e.g., Uu). In the examples described herein, the remote wireless communication device 420 and the relay wireless communication device 425 may be communicatively coupled with each other via a sidelink 455 (e.g., PC5). However, it shall be understood that the remote wireless communication device 420 and the relay wireless communication device 425 may be communicatively coupled with each other via other types of links, such as via WiFi or Bluetooth. The first base station 410 and the second base station 415 may be communicatively coupled via a signaling link 440 (e.g., Xn). The first base station 410 is coupled to the core network 405 via a control plane (e.g., N2) and user plane (e.g., N3) links (collectively, links 430). Similarly, the second base station 415 is coupled to the core network 405 via a control plane (e.g., N2) and user plane (e.g., N3) links (collectively, links 435).

In many cases, the remote wireless communication device 420 uses the cellular link 445 to send traffic or user plane data to the core network 405 via the first base station 410. However, in some situations, the cellular link 445 between the remote wireless communication device 420 and the first base station 410 may be compromised (e.g., due to interference, noise, a small signal-to-noise (SNR) ratio, equipment failure, etc.) for all services or some services. In such situations, the remote wireless communication device 420 may seek to send data to the core network 405 via the relay wireless communication device 425. In such a case, the data is transmitted from the remote wireless communication device 420 to the relay wireless communication device 425 via the sidelink 455; the relay wireless communication device 425, in turn, relays the data to the second base station 415 via the cellular link 450; and the second base station 415 forwards the data to the core network 405 via the user plane (e.g., N3) link of the links 435.

The 5G NR specification includes policy control information for use by wireless communication devices to control how data may be routed to the core network 405 based on some criteria. Some of the policy control information is included in an Access Network Discovery & Selection Policy (ANDSP) specification. The ANDSP specification provides rules for wireless communication devices for routing data to the core network 405 using a non-3GPP access network (e.g., a WiFi network). Other policy control information is included in a UE route selection policy (URSP) specification. The URSP specification provides rules on how wireless communication devices are to route data via 3GPP and non-3GPP networks based on the particular application generating the data (e.g., voice call, social media, gaming, etc.), and the characteristics associated with the data routing session. The URSP specification may provide a traffic descriptor that specifies relay operation including a route selection descriptor that would specify protocol data unit (PDU) session parameters.

Still other policy control information provides rules on how to route data between wireless communication devices (outside of the 5G NR network) via proximity services (ProSe) sidelink communications. The ProSe policy is typically tailored for public safety services (e.g., fire fighters, police, first responders, etc.), as well as certain commercial applications, such as interactive gaming. The aforementioned policy control information lacks data routing rules when it comes to routing data from a remote wireless communication device (e.g., the remote wireless communication device 420) to the core network 405 via one or more other relay wireless communication devices (e.g., the relay wireless communication device 425). Here, the remote wireless communication device 420 is referred to as the "remote" device because it originates the data to be transmitted to the core network 405, and the relay wireless communication device 425 is referred to as the "relay" device as it relays the data from the remote wireless communication device 420 to the core network 405 via its cellular link 450 to the second base station 415.

The policy control information enhancements provide rules for three (3) types of relay data routing options. For a layer 3 (L3) relay data routing option, in which the routing of data is from the remote wireless communication device 420 to the core network 405 via the sidelink 455, the relay wireless communication device 425, the cellular link 450, the second base station 415, and the user plane (N3) link of the links 435 via an internet protocol (IP) or L3 routing. For a layer 3 (L3) relay with non-3$^{rd}$ Generation Partnership Project (3GPP) Interworking Function (N3IWF) data routing option, in which the routing of data is from the remote wireless communication device 420 to the core network 405 via the sidelink 455, the relay wireless communication device 425, the cellular link 450, the second base station 415, and the user plane (N3) link of the links 435 via an internet protocol (IP) or L3 routing per a protocol data unit (PDU) session extending from the remote wireless communication device 420 to an N3IWF of the core network 405, as discussed further herein. For a layer 2 (L2) relay data routing option, in which the routing of data is from the remote wireless communication device 420 to the core network 405 via the sidelink 455, relay wireless communication device 425, the cellular link 450, the second base station 415, and the user plane (N3) link 435 via a layer 2 routing per a protocol data unit (PDU) session extending from the remote wireless communication device 420 to a user plane function on the core network 405.

Figure 5:
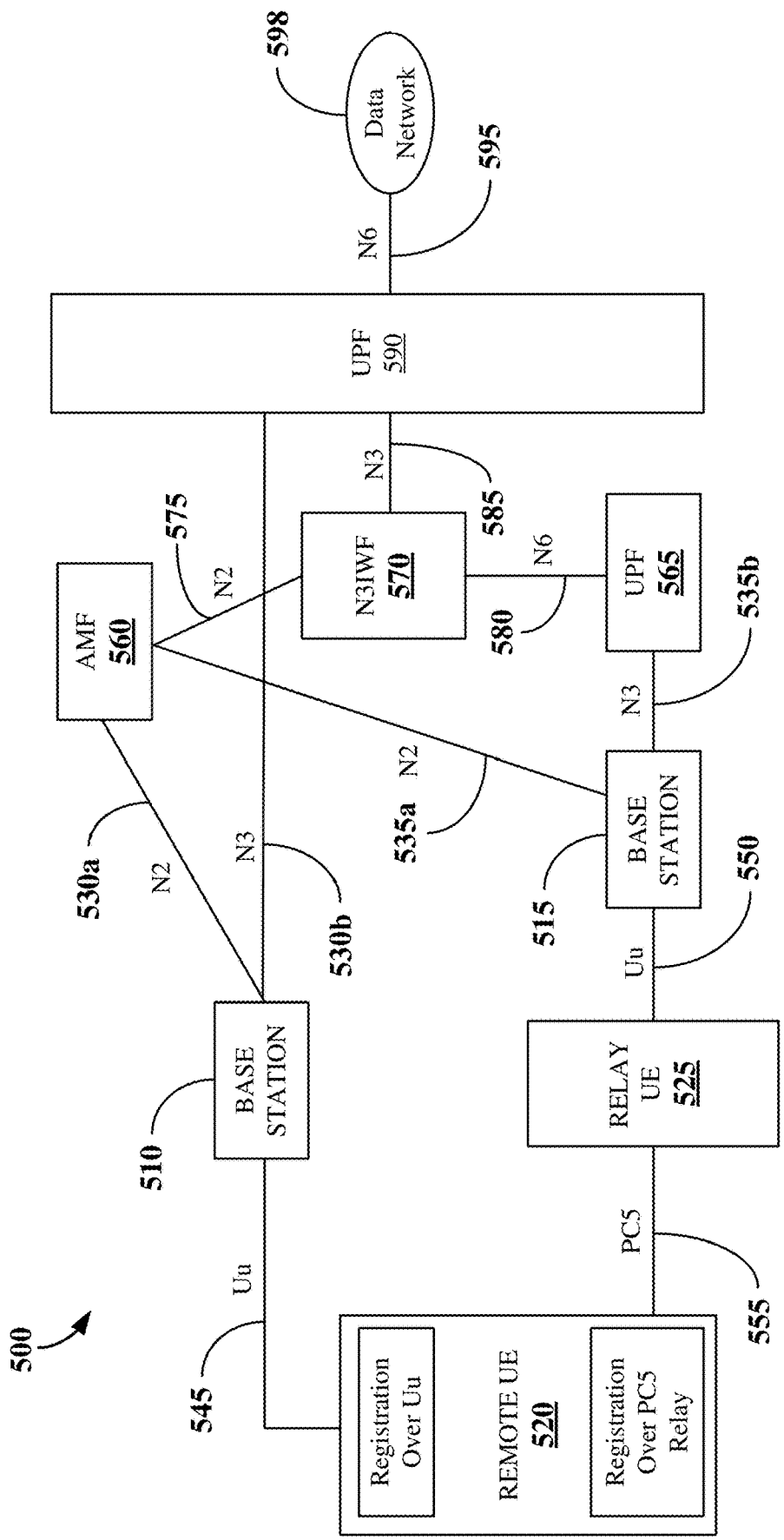
FIG. 5 is a block diagram illustrating another wireless communication system supporting remote wireless communication device to network via at least one relay wireless communication device according to some aspects.

FIG. 5 is a block diagram illustrating a wireless communication system 500 supporting remote wireless communication device-to-network communication via at least one relay wireless communication device according to some aspects. The wireless communication system 500 is an exemplary implementation of the wireless communication system 400 previously discussed. The wireless communication system 500 is referred to in the discussion of the three (3) relay data routing options mentioned above.

The wireless communication system 500 includes a remote wireless communication device 520 (e.g., a remote UE), a relay wireless communication device 525 (e.g., a relay UE), a first base station 510, a second base station 515, and a core network including an access and mobility management function (AMF) 560, a first user plane function (UPF) 565, an N3IWF 570, and a second UPF 590. The core network is coupled to a backhaul data network 598 via a user plane link 595 (e.g., an N6 link).

Similarly, the remote wireless communication device 520 may be communicatively coupled to the first base station 510 via a cellular link 545 (e.g., a Uu link). The relay wireless communication device 525 may be communicatively coupled to the second base station 515 via a cellular link 550 (e.g., a Uu link). The remote wireless communication device 520 and the relay wireless communication device 525 may be communicatively coupled to each other via a sidelink 555 (e.g., a PC5 link).

The first base station 510 is coupled to the AMF 560 via a control plane link 530*a* (e.g., an N2 link). The first base station 510 is also coupled to the second UPF 590 via a user plane link 530*b* (e.g., an N3 link). The second base station 515 is coupled to the AMF 560 via a control plane link 535*a* (e.g., an N2 link). The second base station 515 is also coupled to the first UPF 565 via a user plane link 535*b* (e.g., an N3 link). The first UPF 565 is coupled to the N3IWF 570 via a user plane link 580 (e.g., an N6 link). The N3IWF 570 is coupled to the second UPF 590 via the user plane link 585 (e.g., an N3 link). In addition, the second UPF 590 is coupled to the backhaul data network 598 via a user plane link 595 (e.g., an N6 link).

The N3IWF 570 allows wireless communication devices to communicate with the N3IWF via PDU sessions by way of non-3GPP networks, such as WiFi networks. Prior to the inclusion of the N3IWF 570, wireless communication devices communicating with the core network via a non-3GPP network could not do so via a PDU session. Thus, the security, privacy, and other features provided to a PDU session could not be provided to such wireless communication devices. For example, such wireless communication devices depended on the security and privacy features provided by the non-3GPP network through which the data traversed. With the inclusion of the N3IWF 570 in the core network, a PDU session may be established between a wireless communication device and the N3IWF 570 even though the data traverses a non-3GPP network. Thus, in some aspects, the N3IWF 570 provide an N3IWF that enables a remote wireless communication device to communication NAS messages to and from the AMF 560.

The remote wireless communication device 520 sets up a sidelink (e.g., PC5 link or unicast link) with the relay wireless communication device 525 by sending sidelink establishing signaling to the relay wireless communication device 525 processed by layers 3, 2, and 1 proximity service (ProSe) protocol stack operations. This involves the remote wireless communication device 520 performing layer 3 protocol stack operations on the signaling, such as PC5-S and PC5-RRC operations; performing layer 2 protocol stack operations on the signaling including PC5-PDCP operations, PC5-RLC operations, and PCT5-MAC operations; and performing layer 1 protocol stack operation on the signaling including PC5-PHY operations.

The relay wireless communication device 525 performs complementary layers 1, 2, and 3 operations on the signaling received from the remote wireless communication device 520 to complete setting up the sidelink with the remote wireless communication device 520. For example, these operations include performing layer 1 protocol stack operation including PC5-PHY layer operations on the signaling received from the remote wireless communication device 520; performing layer 2 protocol stack operations including operations performed by a PC5-MAC layer, a PC5-RLC layer, and a PC5-PDCP layer on the signaling received from the PC5-PHY layer; and performing layer 3 protocol stack operations including PC5-S layer and PC5-RRC layer operations on the signaling from the layer 2 operations.

For the L3 relay with N3IWF data routing option, the remote wireless communication device 520 is visible to the core network, as if it were behind a non-3GPP network. Thus, in this case, the remote wireless communication device 520 has a NAS connection to the core network (e.g., the AMF 560) via the relay wireless communication device 525, and an AS connection to the second base station 515 via the relay wireless communication device 525. Accordingly, the remote wireless communication device 520 may setup an IP PDU session with the N3IWF 570 on the core network.

The remote wireless communication device 520 sets up an IP PDU session with the N3IWF 570 by performing NAS protocol stack processing operations on signaling, performing NR protocol processing operations on the signaling, and performing PC5 protocol processing operations. As indicated, the N3IWF 570 is coupled to the AMF 560 via a control plane link 575 (e.g., an N2 link).

The relay wireless communication device 525, in turn, performs complementary PC5 protocol stack processing operations on the signaling received from the remote wireless communication device 520 via the sidelink 555 (e.g., a PC5 link). The signaling may then be provided to an adaptation relay layer for the relay wireless communication device 525 to enhance the PC5 session to multiplex other data from one or more other remote wireless communication devices to the core network. The signaling is then processed via lower NR protocol layer stacks.

The second base station 515, in turn, performs complementary NR protocol stack processing operations on the signaling received from the relay wireless communication device 525 via the cellular link 550 (e.g., a Uu link). The signaling is then provided to an adaptation relay layer for the second base station 515 to demultiplex the data from all of the one or more remote wireless communication devices for transmission to the core network. The signaling is then processed via upper NR protocol layer stacks. The second base station 515 then processes the signaling via an N2 control plane protocol stack, and provides the signaling to the AMF 560 via the control plane link 535*a* (e.g., an N2 link). The AMF 560 then sets up the IP PDU session between the remote wireless communication device 520 and the N3IWF 570.

As the name implies, the L3 relay with N3IWF data routing operation routes the data generated by an application from the remote wireless communication device 520 to the N3IWF 570 via an L3 (IP) routing per a PDU session. For example, a particular application running on the remote wireless communication device 520 generates data to be routed to the N3IWF 570, and thereafter, further down to an external data network (e.g., the backhaul data network 598). A PDU layer operation generates an IP packet including the data. The remote wireless communication device 520 has an IP address as it has a NAS context with the core network. The IP packet is then processed by the PC5 protocol stack of the remote wireless communication device 520.

The relay wireless communication device 525 performs the complementary PC5 protocol stack operations on the IP packet received from the remote wireless communication device 520 via the sidelink 555 (e.g., a PC5 link). The adaptation relay layer may multiplex the data from the remote wireless communication device 520 with data from one or more other remote wireless communication devices. The adaptation relay layer sends the IP packet through an NR protocol processing stack, for transmission to the second base station 515 via the cellular link 550 (e.g., a Uu link).

The second base station 515 performs the complementary NR protocol stack operations on the IP packet received from the relay wireless communication device 525 via the cellular link 550. The adaptation layer at the second base station 515 demultiplexes the data from the remote wireless communication devices, which the relay wireless communication device 525 multiplexed. The second base station 515 processes the IP packet via an N3 user plane protocol stack.

The first UPF 565 performs the complementary N3 user plane protocol stack operations on the IP packet received from the second base station 515 via the user plane link 535*b* (e.g., an N6 link), and performs N6 user plane protocol stack operations via N3/N6 user plane protocol stacks. The N3IWF 570 then performs the complementary N6 user plane protocol stack operations on the IP packet received from the first UPF 565 via the user plane link 580 (e.g., an N6 link), and performs N3 user plane protocol stack operations via the N3/N6 user plane protocol stacks. The N3IWF 570 may then send the IP packet to an external data network (e.g., the backhaul data network 598) via the user plane link 585 (e.g., an N3 link), the second UPF 590, and the user plane link 595 (e.g., an N6 link).

Figure 6:
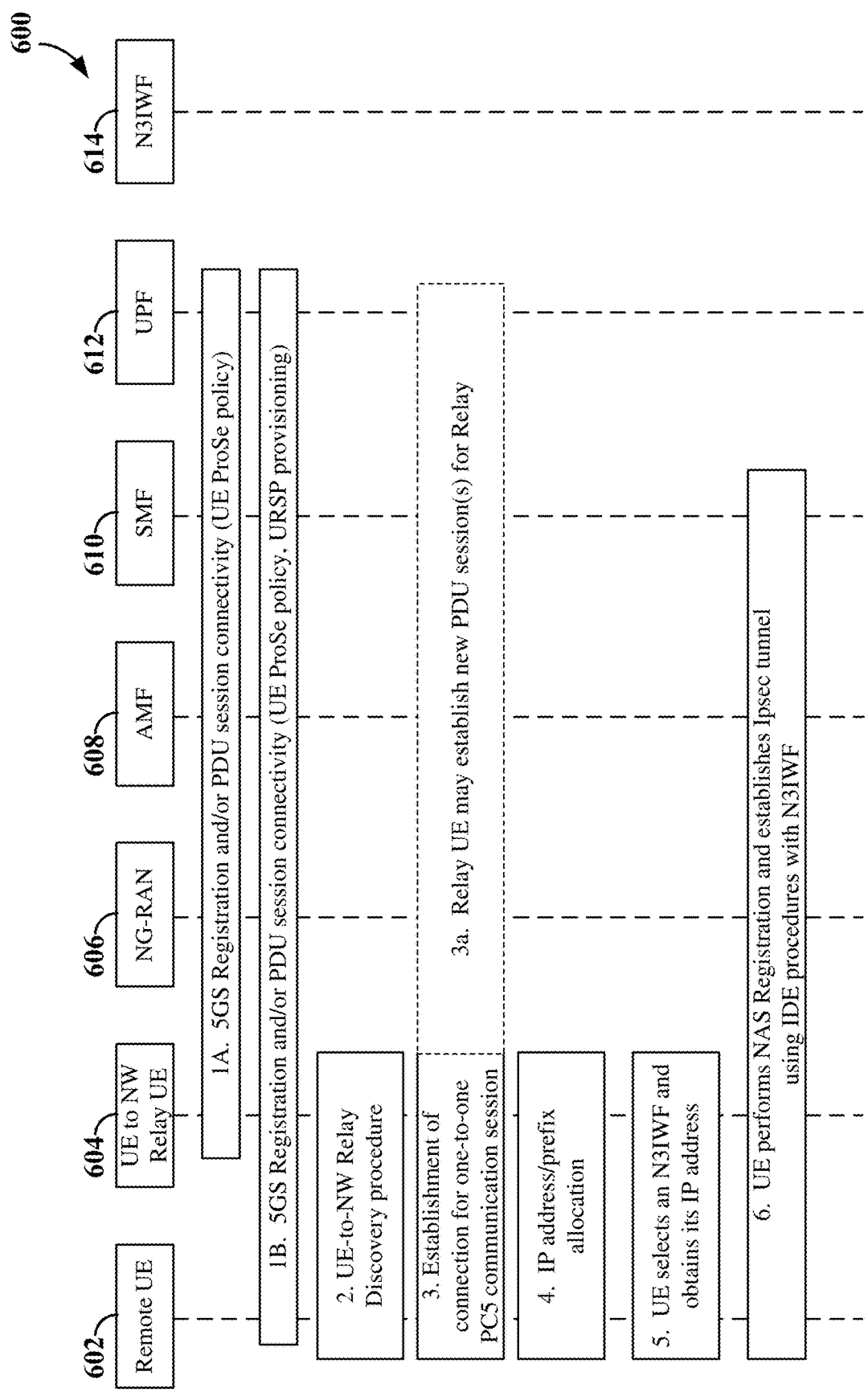
FIG. 6 is a diagram illustrating an example of an interworking function connection setup procedure according to some aspects.

FIG. 6 illustrates an example of a Layer-3 UE-to-Network Relay with N3IWF connection setup procedure in a wireless communication system 600 including a remote UE 602, a relay UE 604, a next-generation RAN (NG-RAN) 606, an access and mobility management function (AMF) 608, a session management function (SMF) 610, a user plane function (UPF) 612, and a non-3$^{rd}$ Generation Partnership Project interworking function (N3IWF) 614. In some examples, the remote UE 602, the relay UE 604, the NG-RAN 606, the AMF 608, and the N3IWF 614 may correspond to the remote wireless communication device 520, the relay wireless communication device 525, the second base station 515, the AMF 560, and the N3IWF 570 of FIG. 5, respectively.

At 1A of FIG. 6, the relay UE 604 is provisioned by the 5G core network with network policy and parameters and/or is preconfigured (e.g., upon activation) with the network policy and parameters. If the relay UE 604 is a ProSe UE, the relay UE 604 may be provisioned with UE ProSe policy (e.g., as discussed above).

At 1B of FIG. 6, the remote UE 602 is provisioned by the 5G core network with network policy and parameters and/or is preconfigured (e.g., upon activation) with the network policy and parameters. If the remote UE 602 is a ProSe UE, the remote UE 602 may be provisioned with UE ProSe policy and UE route selection policy (URSP) (e.g., as discussed above).

At 2 of FIG. 6, the remote UE 602 conducts a discovery procedure to discover the relay UE 604. For example, the relay UE 604 may broadcast relay discovery information (e.g., on a sidelink resource) that the remote UE 602 may use to identify and establish a relay connection with the relay UE 604. In some examples, the relay UE 604 may broadcast information (e.g., a relay service code as discussed below) that indicate that the relay UE 604 supports N3IWF connectivity.

At 3 of FIG. 6, the remote UE 602 and the relay UE 604 establish a secure PC5 link (e.g., a unicast link) prior to commencing relaying. In addition, at 3a, the relay UE 604 may establish a new PDU session for the relaying.

At 4 of FIG. 6, an IP address and IP prefixes are allocated to the remote UE 602 via the relay UE 604.

In some scenarios, the remote UE 602 may elect to connect to an N3IWF. For example, an application running on the remote UE 602 may use end-to-end network security.

At 5 of FIG. 6, the remote UE 602 selects an N3IWF and determines the corresponding N3IWF IP address. For example, the remote UE 602 may follow the N3IWF selection procedure described in clause 6.5.1.2.2 of 3GPP TS 23.304 V1.0.0 (2021-06).

At 6 of FIG. 6, the remote UE 602 establishes a signaling IP security (IPsec) tunnel using an internet key exchange (IKE) procedure with the N3IWF selected at 5, and performs NAS Registration (e.g., as described in FIG. 4.12.2.2-1 of TS 23.502 V17.1.0 (2021-06)). After the IPSec tunnel is established, the remote UE 602 can perform any of the NAS procedures (including PDU session establishment for the 5G ProSe Layer-3 UE-to-Network Relay PDU Sessions) as specified in clause 4.12 of TS 23.502 V17.1.0 (2021-06).

Figure 7:
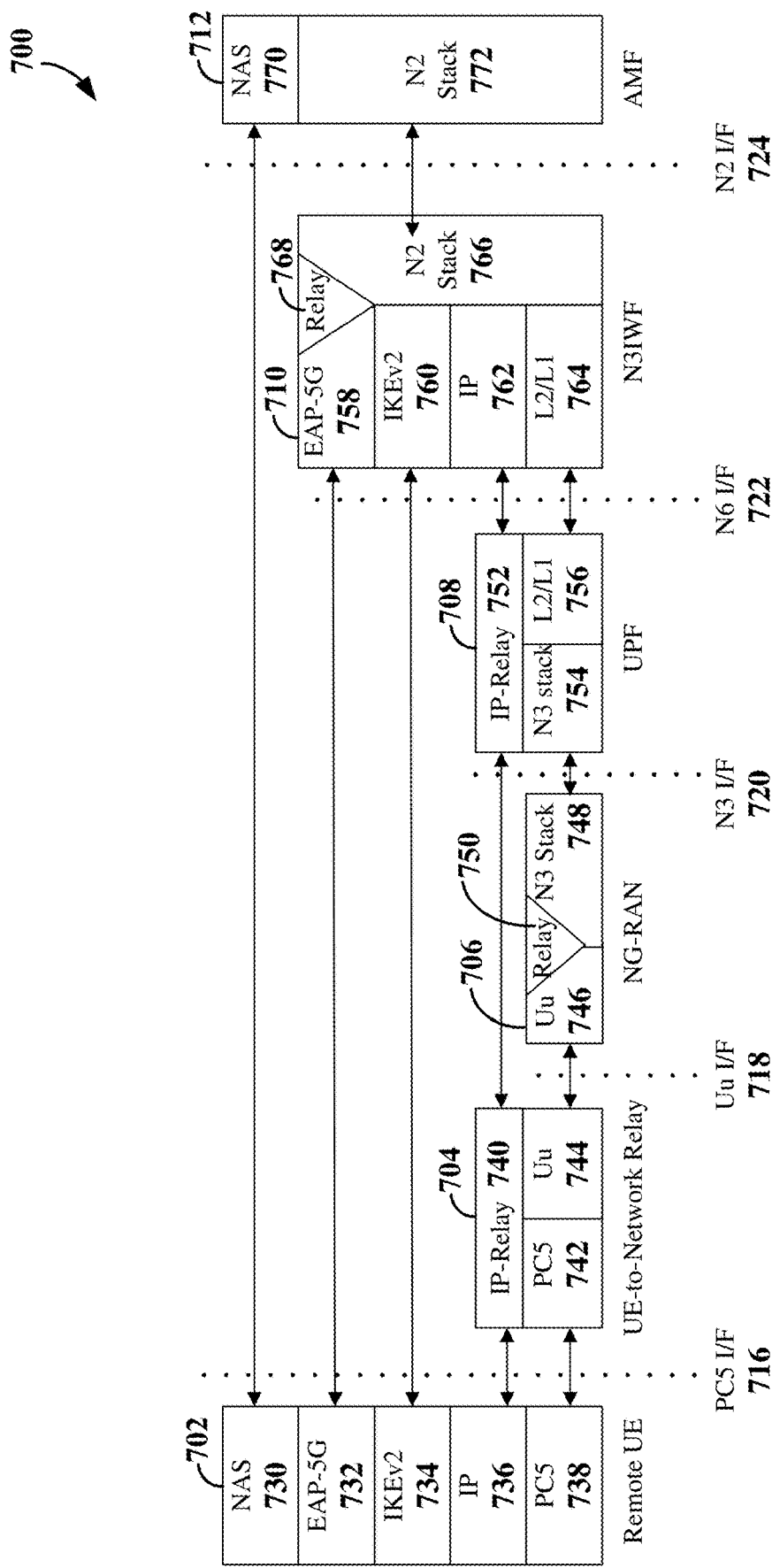
FIG. 7 is a diagram illustrating an example of a protocol stack for a control plane according to some aspects.
Figure 8:
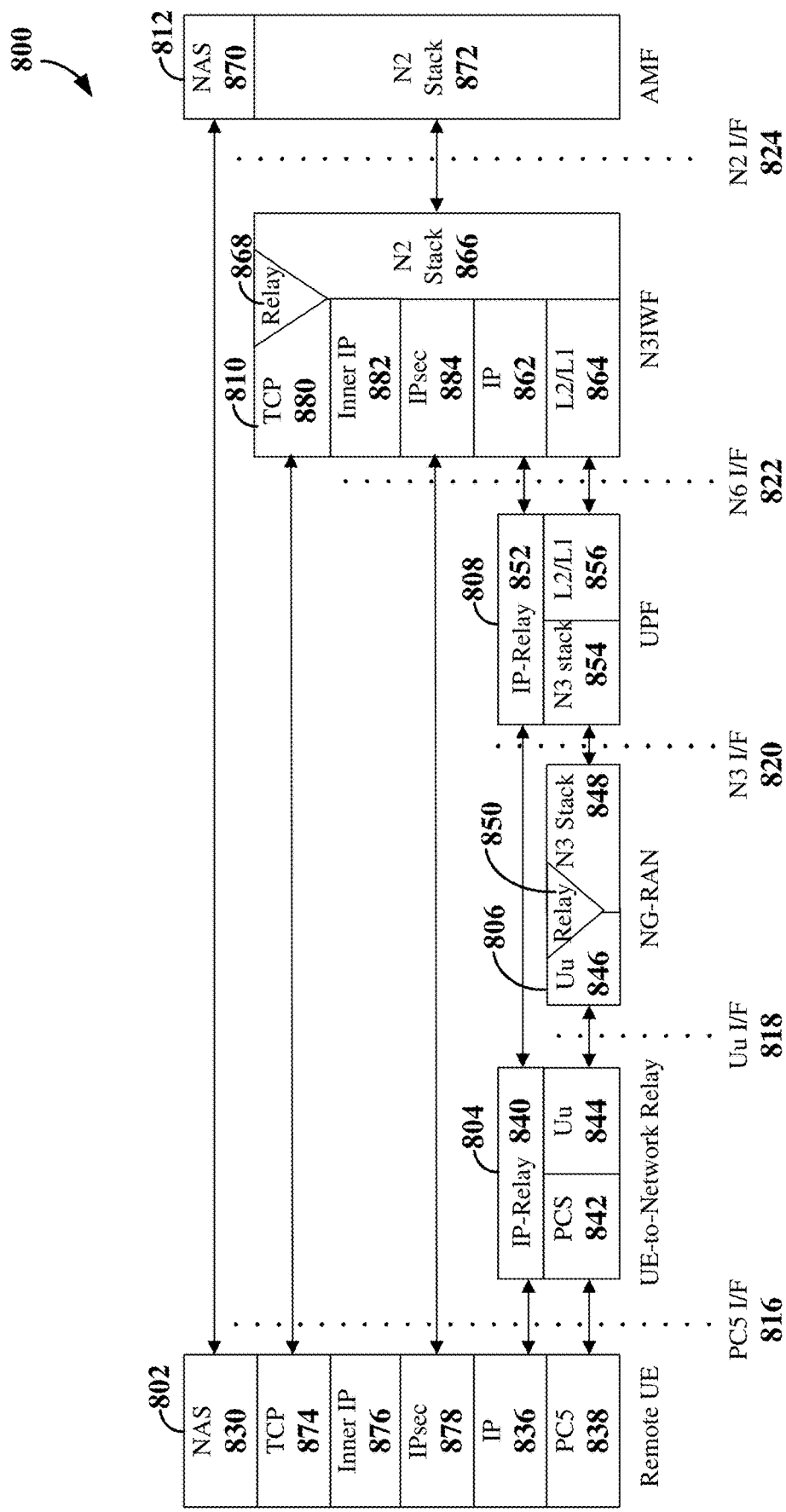
FIG. 8 is a diagram illustrating another example of a protocol stack for a control plane according to some aspects.
Figure 9:
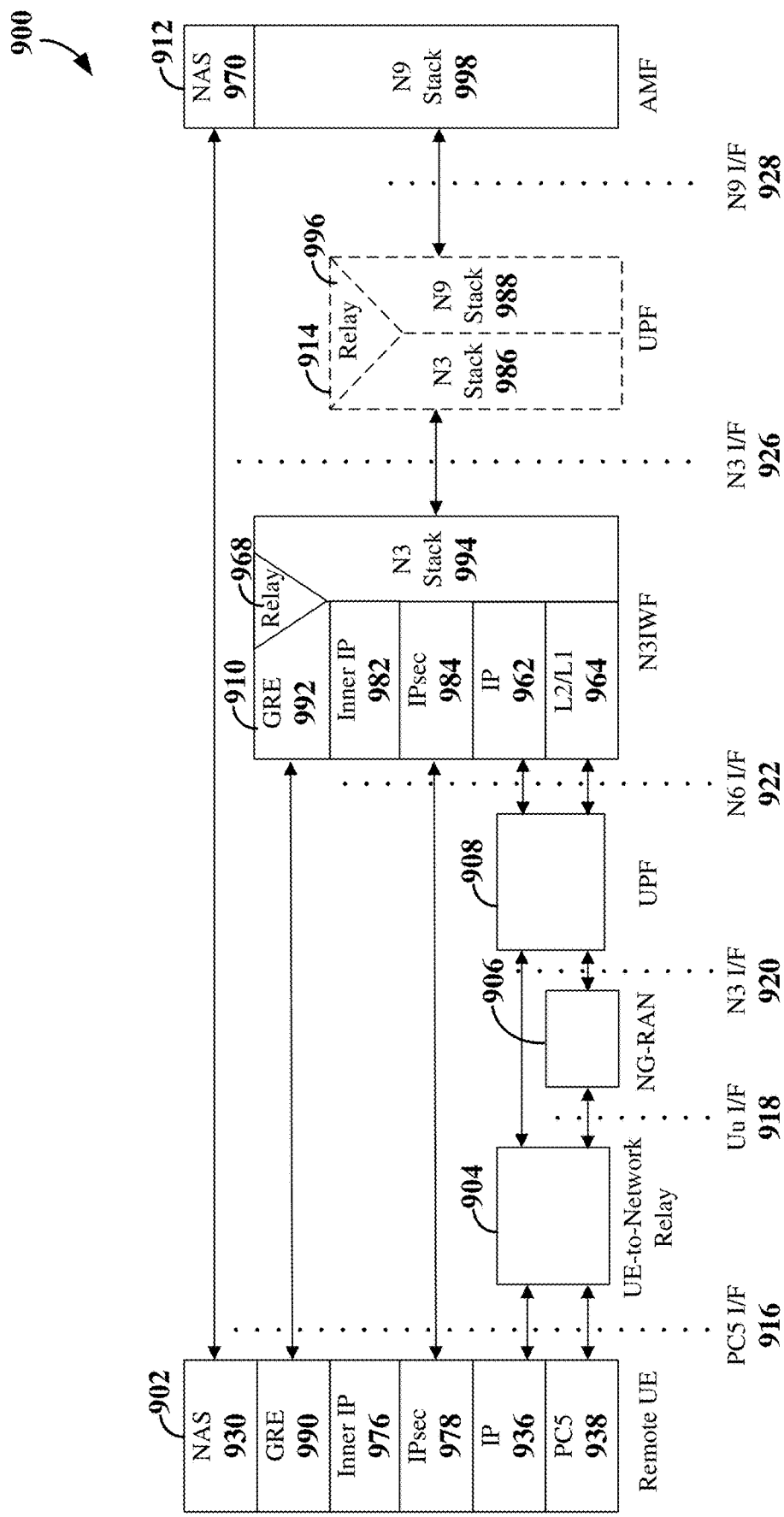
FIG. 9 is a diagram illustrating an example of a protocol stack for a user plane according to some aspects.

FIGS. 7-9 illustrate examples of Layer-3 UE-to-Network Relay protocol stacks with N3IWF. In some aspects, the protocol operations for a remote UE connecting to an N3IWF are similar to those of a UE using untrusted non-3GPP access, or standalone non-public network (SNPN) access. Also, there may be minimal impact for the Layer-3 UE-to-Network Relay. For example, a relay UE may establish the corresponding PDU session according to a Relay Service Code, which provides access to the N3IWF.

The protocol stacks 700 of FIG. 7 include a remote UE protocol stack 702, a UE-to-Network Relay protocol stack 704, an NG-RAN protocol stack 706, a UPF protocol stack 708, an N3IWF protocol stack 710, and an AMF protocol stack 712. In some examples, the remote UE protocol stack 702, the UE-to-Network Relay protocol stack 704, the NG-RAN protocol stack 706, the UPF protocol stack 708, the N3IWF protocol stack 710, and the AMF protocol stack 712 may be used by the remote UE 602, the relay UE 604, the NG-RAN 606, the AMF 608, the UPF 612, and the N3IWF 614 of FIG. 6, respectively. Each of these protocol stacks may support communication via one or more protocol layers (which may be referred to simply as layers herein).

In the example of FIG. 7, the protocol stacks 700 facilitate inter-device communication via a PC5 interface (I/F) 716, a Uu interface 718, an N3 interface 720, an N6 interface 722, and an N2 interface 724. In some examples, the PC5 interface 716, the Uu interface 718, the N3 interface 720, the N6 interface 722, and the N2 interface 724 may correspond to the sidelink 555, the cellular link 550, the user plane link 535b, the user plane link 580, and the control plane link 575 of FIG. 5, respectively.

The remote UE protocol stack 702 includes a NAS layer 730, an extensible authentication protocol (EAP)—5G layer 732, an IKEv2 layer 734, an IP layer 736, and a PC5 layer 738. The remote UE communicates with the network by establishing a PC5 link with the UE-to-Network Relay as discussed above.

The UE-to-Network Relay protocol stack 704 includes an IP-Relay layer 740 for communicating with the IP layer 736, a PC5 layer 742 for communicating with the PC5 layer 738 via the PC5 interface 716, and a Uu layer 744. The NG-RAN protocol stack 706 includes a Uu layer 746 for communicating with the Uu layer 744 via the Uu interface 718, an N3 stack 748, and relay support 750. The UPF protocol stack 708 includes an IP-Relay layer 752 for communicating with the IP-Relay layer 740, an N3 stack 754 for communicating with the N3 stack 748 via the N3 interface 720, and an L2/L1 layer 756.

The N3IWF protocol stack 710 includes an EAP-5G layer 758 for communicating with the EAP-5G layer 732, an IKEv2 layer 760 for communicating with the IKEv2 layer 734, an IP layer 762 for communicating with the IP-Relay layer 752, an L2/L1 layer 764 for communicating with the L2/L1 layer 756 via the N6 interface 722, an N2 stack 766, and relay support 768. The AMF protocol stack 712 includes a NAS layer 770 for communicating with the NAS layer 730 and an N2 stack 722 for communicating with the N2 stack 766 via the N2 interface 724.

FIG. 7 illustrates the control parallel protocol stack before a signaling IPsec security association (SA) is established. The EAP-5G layer and the IKEv2 layer 734 enable the remote UE to use the relay support 768 of the N3IWF. Thus, the remote UE may communicate with its AMF via the N3IWF. For example, the remote UE may construct IKE packets and send them to the IP address of the N3IWF. The IP-Relay layer 740 at the UE-to-Network Relay performs a relay function from the PC5 interface 716 to the Uu interface 718 via a relay PDU session that maps to the PDU for the UE-to-Network Relay. That is, in some aspects, the IKE packets are routed via this PDU in the same manner as data packets are routed to a data network. Upon receiving an IKE packet, the N3IWF may consume the packet or forward it to the AMF for the remote UE.

FIG. 8 illustrates an example of a control parallel protocol stack after a signaling IPsec SA is established. In this scenario, the remote UE is able to communicate with the N3IWF via a secure IPsec tunnel. Thus, the remote UE can send and receive message securely to and from the AMF.

The protocol stacks 800 of FIG. 8 include a remote UE protocol stack 802, a UE-to-Network Relay protocol stack 804, an NG-RAN protocol stack 806, a UPF protocol stack 808, an N3IWF protocol stack 810, and an AMF protocol stack 812. In some examples, the remote UE protocol stack 802, the UE-to-Network Relay protocol stack 804, the NG-RAN protocol stack 806, the UPF protocol stack 808, the N3IWF protocol stack 810, and the AMF protocol stack 812 may be used by the remote UE 602, the relay UE 604, the NG-RAN 606, the AMF 608, the UPF 612, and the N3IWF 614 of FIG. 6, respectively.

In the example of FIG. 8, the protocol stacks 800 facilitate inter-device communication via a PC5 interface (I/F) 816, a Uu interface 818, an N3 interface 820, an N6 interface 822, and an N2 interface 824. In some examples, the PC5 interface 816, the Uu interface 818, the N3 interface 820, the N6 interface 822, and the N2 interface 824 may correspond to the sidelink 555, the cellular link 550, the user plane link 535b, the user plane link 580, and the control plane link 575 of FIG. 5, respectively.

The remote UE protocol stack 802 includes a NAS layer 830, a transmission control protocol (TCP) layer 874, an inner IP layer 876, an IPsec layer 878 (tunnel mode), an IP layer 836, and a PC5 layer 838.

The UE-to-Network Relay protocol stack 804, the NG-RAN protocol stack 806, and the UPF protocol stack 808 are similar to the corresponding stacks of FIG. 7. The UE-to-Network Relay protocol stack 804 includes an IP-Relay layer 840 for communicating with the IP layer 836, a PC5 layer 842 for communicating with the PC5 layer 838 via the PC5 interface 816, and a Uu layer 844. The NG-RAN protocol stack 806 includes a Uu layer 846 for communicating with the Uu layer 844 via the Uu interface 818, an N3 stack 848, and relay support 850. The UPF protocol stack 808 includes an IP-Relay layer 852 for communicating with the IP-Relay layer 840, an N3 stack 854 for communicating with the N3 stack 848 via the N3 interface 820, and an L2/L1 layer 856.

The N3IWF protocol stack 810 includes a TCP layer 880 for communicating with the TCP layer 874, an inner IP layer 882 for communicating with the inner IP layer 876, an IPsec layer 884 (tunnel mode) for communicating with the inner IP layer 876, an IP layer 862 for communicating with the IP-Relay layer 852, an L2/L1 layer 864 for communicating with the L2/L1 layer 856 via the N6 interface 822, an N2 stack 866, and relay support 868. The AMF protocol stack 812 includes a NAS layer 870 for communicating with the NAS layer 830 and an N2 stack 822 for communicating with the N2 stack 866 via the N2 interface 824.

FIG. 9 illustrates an example of a user plane protocol stack. In this case, the remote UE has established a generic routing encapsulation (GRE) tunnel and an IPsec tunnel with the N3IWF. Thus, the remote UE may exchange data securely with the network (e.g., the relay, the NG-RAN, and the relay UPF does not have visibility for these packets).

Here, N3IWF data may be routed via a user plane session. For example, the PDU session of the UE may be used to route this traffic. For user plane data, the N3IWF will relay data over the N3 stack so that the data is sent to the corresponding UPF for the remote UE. Thus, the user plane data may be sent to the PDU session anchor pointing to the remote UE. In contrast, control plane information may be forwarded to the remote UE's AMF.

The protocol stacks 900 of FIG. 9 include a remote UE protocol stack 902, a UE-to-Network Relay protocol stack 904, an NG-RAN protocol stack 906, a UPF protocol stack 908, an N3IWF protocol stack 910, an AMF protocol stack 912, and a UPF protocol stack 914 (e.g., for a UPF for the remote UE, such as the second UPF 590 of FIG. 5). In some examples, the remote UE protocol stack 902, the UE-to-Network Relay protocol stack 904, the NG-RAN protocol stack 906, the UPF protocol stack 908, the N3IWF protocol stack 910, and the AMF protocol stack 912 may be used by the remote UE 602, the relay UE 604, the NG-RAN 606, the AMF 608, the UPF 612, and the N3IWF 614 of FIG. 6, respectively.

In the example of FIG. 9, the protocol stacks 900 facilitate inter-device communication via a PC5 interface (I/F) 916, a Uu interface 918, an N3 interface 920, an N6 interface 922, an N3 interface 926, and an N9 interface 928. In some examples, the PC5 interface 916, the Uu interface 918, the N3 interface 920, the N6 interface 922, and the N3 interface 926 may correspond to the sidelink 555, the cellular link 550, the user plane link 535b, the user plane link 580, and the user plane link 585 of FIG. 5, respectively.

The remote UE protocol stack 902 includes a NAS layer 930, a GRE layer 992, an inner IP layer 976, an IPsec layer 978 (tunnel mode), an IP layer 936, and a PC5 layer 938. The UE-to-Network Relay protocol stack 904, the NG-RAN protocol stack 906, and the UPF protocol stack 908 are similar to the corresponding stacks of FIGS. 7 and 8. Thus, the details of these protocol stacks will not be repeated.

The N3IWF protocol stack 910 includes a GRE layer 992 for communicating with the GRE layer 990, an inner IP layer 982 for communicating with the inner IP layer 976, an IPsec layer 984 (tunnel mode) for communicating with the inner IP layer 976, an IP layer 962 for communicating with the IP-Relay layer 952, an L2/L1 layer 964 for communicating with the L2/L1 layer 956 via the N6 interface 922, an N3 stack 994, and relay support 968.

The UPF protocol stack 914 includes an N3 stack 986 for communicating with the N3 stack 994 via the N3 interface 926, an N9 stack 988, and relay support 996. The AMF protocol stack 912 includes a NAS layer 970 for communicating with the NAS layer 930 and an N9 stack 998 for communicating with the N9 stack 988 via the N9 interface 9284.

As discussed above in conjunction with FIG. 6, relay service codes (RSCs) may be used during relay discovery to identify the connectivity services supported by the relay UE. Remote UEs interested in a relay UE (e.g., an L3 ProSe UE-to-Network Relay) for a connectivity service discover the relay UE by monitoring the corresponding relay service code(s). Different relay service codes may be assigned for different PC5 services (e.g., for public safety police members, public safety fire fighters, network controlled interactive service (NCIS) gaming, NCIS virtual conference, etc.).

A relay UE may establish a dedicated PDU session associated with one or more RSCs. At the remote UE, a URSP may specify how a certain type of traffic is to be routed (e.g., PDU session details, requirements for using a relay with N3IWF connectivity, etc.). Also, based on a relay service code (RSC), a relay UE may determine whether to set up a new PDU session for relaying traffic or whether an existing PDU session may be used for relaying traffic.

RSCs and PDU Session parameters (e.g., PDU Session type, data network name (DNN), session and service continuity (SSC) Mode, single network slice selection assistance information (S-NSSAI), access type preference) are provisioned to the remote UE and the relay UE. For example, these parameters may be pre-configured or provisioned to the UE by a policy control function (PCF) during Uu Registration. Security information for discovery messages is provisioned during the key management process.

For mobility handling for a relay UE with N3IWF, connection management may be controlled via the relay UE with N3IWF support. When a corresponding PDU Session is established, the 5GS (e.g., the SMF), based on certain parameters (e.g., DNN, S-NSSAI), selects the UPF that ca provide access to the N3IWF. That is, since the remote UE reaches the N3IWF via the UPF of the relay UE, the UPF selected for a relay PDU session will be one that has a connection to an N3IWF to which the remote UE can connect. The UPF for the relay UE and the N3IWF may be co-located or may not be co-located.

In some examples, different UPFs may be assigned for a remote UE for control plane signaling and user plane signaling. However, both of these UPFs may connect to remote UE's N3IWF. Thus, based on configurations, the relay UE may use different PDU sessions for signaling traffic (e.g., IKE signaling) between a remote UE and the N3IWF and for the user plane traffic of the remote UE via the N3IWF.

A remote UE may switch to a different relay UE while maintaining an N3IWF session. For example, a remote UE may change relay UEs (and, hence, UPFs) while maintaining the session with the N3IWF when the remote UE and the N3IWF support the mobility and multihoming protocol (MOBIKE). This is negotiated between the remote UE and the N3IWF as specified in clause 4.12.2.2 of TS 23.502, V17.1.0 (2021-06)). IKE keep alive signals between the remote UE and the N3IWF may be used for detecting a possible path failure. When IKE keep alive signals are used, the remote UE will keep the PC5 connection and relay UE will keep the PDU Session. URSP rules, for steering the mapping between UE applications and PDU sessions, can be used for any connectivity model (e.g., the multiple PDU sessions model discussed below).

Figure 10:
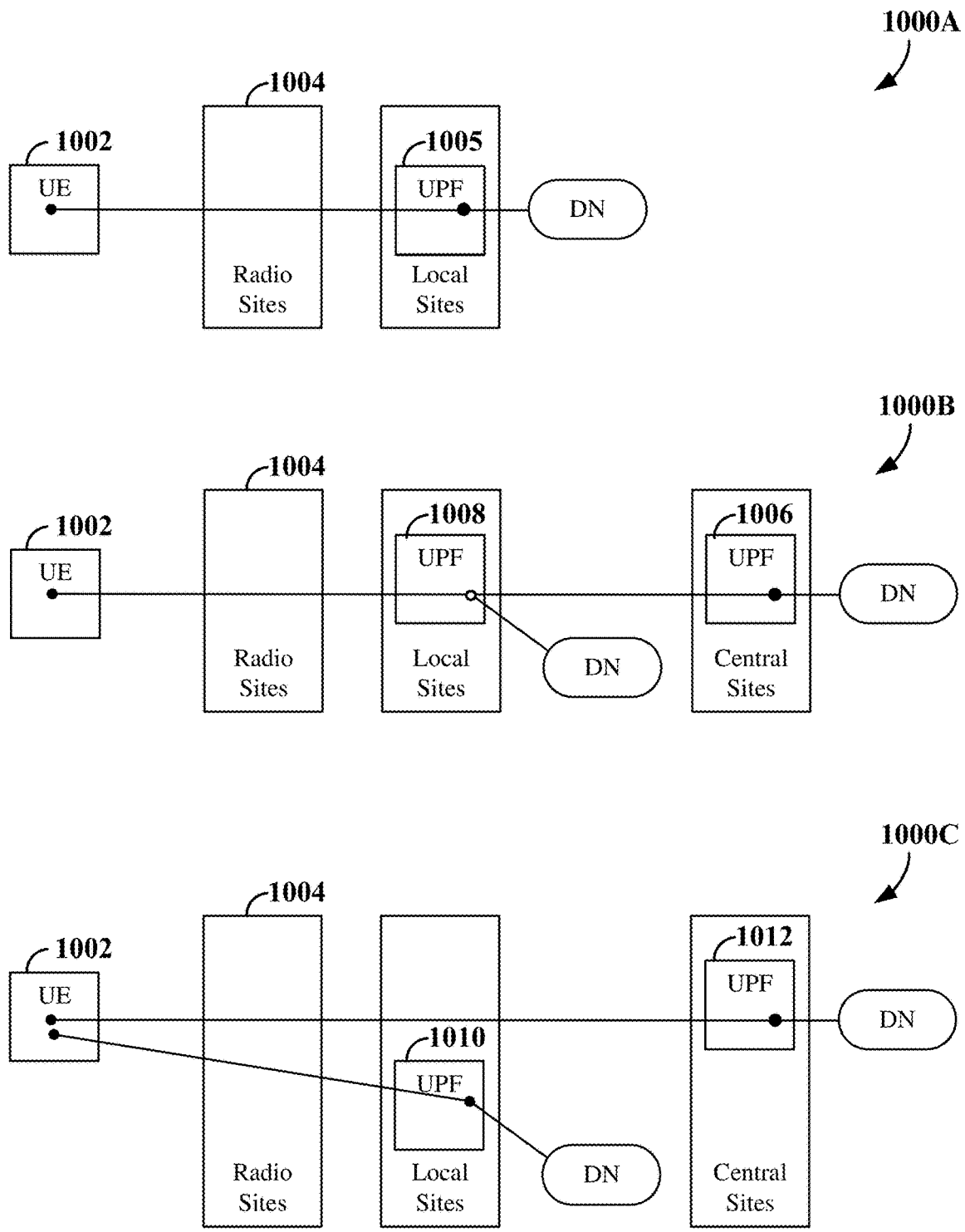
FIG. 10 is a diagram illustrating examples of connectivity models for edge computing according to some aspects.

In some deployments, network functionality may be distributed to provide better performance (e.g., lower latency). FIG. 10 illustrates several examples of connectivity models for edge computing in 5GS. In each of these models, a UE 1002 (e.g., a relay UE) accesses a data network (DN) via various radio sites 1004. Moreover, for edge computing, a UPF that enables the UE 1002 to access a data network (DN) via various radio sites 1004 may be located at a local site (i.e., a site that close to the UE location). That is, the anchor point where a PDU session is hosted may be selected to be as close to the UE 1002 as possible.

A first diagram 1100A illustrates a distributed anchor point model. Here, for a PDU session, the PDU session anchor (PSA) UPF 1005 is in a local site.

A second diagram 1100B illustrates a session breakout model. Here, a PDU session has a PSA UPF 1006 in a central site (C-PSA UPF) and one or more PSA UPFs 1008 in the local site (L-PSA UPF). The C-PSA UPF provides the IP anchor point when a UL Classifier is used.

In some aspects, a UL Classifier may specify that a certain type of data should be sent to a certain network. Thus, the edge computing application traffic may be selectively diverted to the L-PSA UPF based on the UL Classifier or based on multi-homing branching point mechanisms.

A third diagram 1100C illustrates a multiple PDU session model. Here, the edge computing applications of the UE may use PDU Session(s) with a PSA UPF(s) 1010 in the local site(s). The rest of applications of the UE may use PDU Session(s) with PSA UPF(s) 1012 in the central site(s).

In some scenarios (e.g., due to UE mobility), the PSA UPFs of FIG. 10 may change over time. For example, for the distributed anchor point model, the PSA UPF may be changed using SSC mode 2 or 3. For the session breakout model, the L-PSA UPF may be changed. For the multiple PDU sessions model, the PSA UPF may be changed using SSC mode 3 with multiple PDU sessions.

In view of the above, under certain circumstances (e.g., mobility of a relay UE), the PSA UPF for a serving relay PDU session used by a UE to connect to an N3IWF may change. For example, in an L3 relay with an N3IWF architecture, a remote UE may use the relay UE PDU session to connect to the N3IWF, via the relay UE UPF. In some examples, the relay UE may be connected to the network using any of the edge computing connectivity models described above.

As discussed above, upon discovering a relay UE, a remote UE obtains an IP address from the relay UE, selects an N3IWF, determines the N3IWF IP address, and connects to the N3IWF. If either the PSA UPF or L-PSA UPF of the relay UE are changed to support edge computing as discussed above, then the N3IWF selected by the remote UE may not be optimal at this point. In this case, it is desirable to trigger an N3IWF selection at the remote UE to select an N3IWF that is reachable locally by the relay UE's new PSA UPF or the L-PSA UPF. However, in an 5G ProSe L3 UE-to-Network relay, there is no message or procedure defined to allow a remote UE to request a relay UE to monitor and report multi-cast and broadcast system (MBS) services, or request a report of the relay UE cell information, UPF relocation, and so on.

A relay UE may detect a UPF relocation in various ways. In some examples, a relay UE may detect the change in the IP address of the serving relay PDU session or detect the change in the PSA or UPF of the serving relay PDU session. An IP address change for the same PSA may happen whereby the relay UE is notified of the new IP address range or IPv6 prefix via a PDU session modification procedure. The relay UE may be notified of the change in the domain name server (DNS) server address by the SMF via a PDU session modification command (Local DNS Server Address). The relay UE PDU session may be established with the new UPF when there is a change of the PSA serving a PDU Session of an SSC mode 2 relay UE or an SSC mode 3 relay UE.

Upon detecting the change in the relay PDU session IP address or the DNS server change, the relay UE may initiate a PC5 link modification procedure or a dynamic host configuration protocol (DHCP) or IPv6 stateless address auto-configuration (SLAA) procedure to provide updated information to the remote UE. Upon detecting the change in the UPF relocation from the serving PSA change, the relay UE may send a UPF relocation notification to one or more remote UEs (e.g., UEs connected to the relay for certain RSC and/or UEs subscribed with the relay UE for UPF relocation notification service).

In view of the above, a remote UE N3IWF selection trigger may involve the remote UE initiating an N3IWF selection upon receiving one or more notifications from a relay UE. These notifications may include, for example, an IP address change associated with the serving relay PDU session, a DNS server change associated with the serving relay PDU session, or a UPF relocation event.

In some examples, the remote UE may trigger N3IWF selection if the N3IWF is not reachable. For example, if the remote UE is unable to connect to the current N3IWF for a period of time, the remote UE may select another N3IWF.

Upon selecting a new N3IWF, the remote UE establishes a signaling IPsec tunnel using IKE procedures with new N3IWF and performs NAS Registration as discussed above. The new AMF establishes the UE context with the new N3IWF during the NAS registration. The new AMF informs the old AMF of the UE registration status, which triggers the release of the UE context on the old AMF and the old N3IWF.

In addition to UPF relocation, a relay UE may undergo changes over time that may affect a remote UE that is using the relay UE for relaying operations. For example, a relay UE may add or drop various relay-related services over time.

The disclosure relates in some aspects to enabling a remote UE to subscribe with a relay UE for one or more relay UE notification services. In some examples, a relay UE may advertise the services it supports and indicate for which services it provides notifications by default (e.g., without any subscription from a remote UE). For the non-default services, a remote UE may subscribe with the relay UE to receive notifications for certain events. These events may include for example, Cell Information of the relay UE, Location Information of the relay UE, UPF relocation of the relay UE, and MBS services supported by the relay UE.

The remote UE may decide to subscribe for one or more of these events based on the RSC for which the relay connection is setup. The remote UE may indicate the type of notification it is interested in, as well as associated notification configuration information (e.g., the periodicity of the reporting, event-based trigger reporting, or the type of MBS service) in a PC5-S request message. In response to this request message, the relay UE may send a response message to the remote UE indicating which subscriptions have been accepted and the details of the associated notifications.

Upon detection of a subscribed event at the relay UE, the relay UE may send a unicast transmission, a broadcast transmission, or a groupcast transmission for the event notification to the remote UE. This notification message may be a new PC5-S message or a Relay Discovery Additional Info message in some examples. The notification message may include the relay UE Cell ID, location details (e.g., latitude/longitude or other position coordinates), UPF relocation event, MBS Service information, etc. The relay UE may also send a notification message to advertise any services that it stops supporting (e.g., indicating that MBS services or positioning services have stopped).

Figure 11:
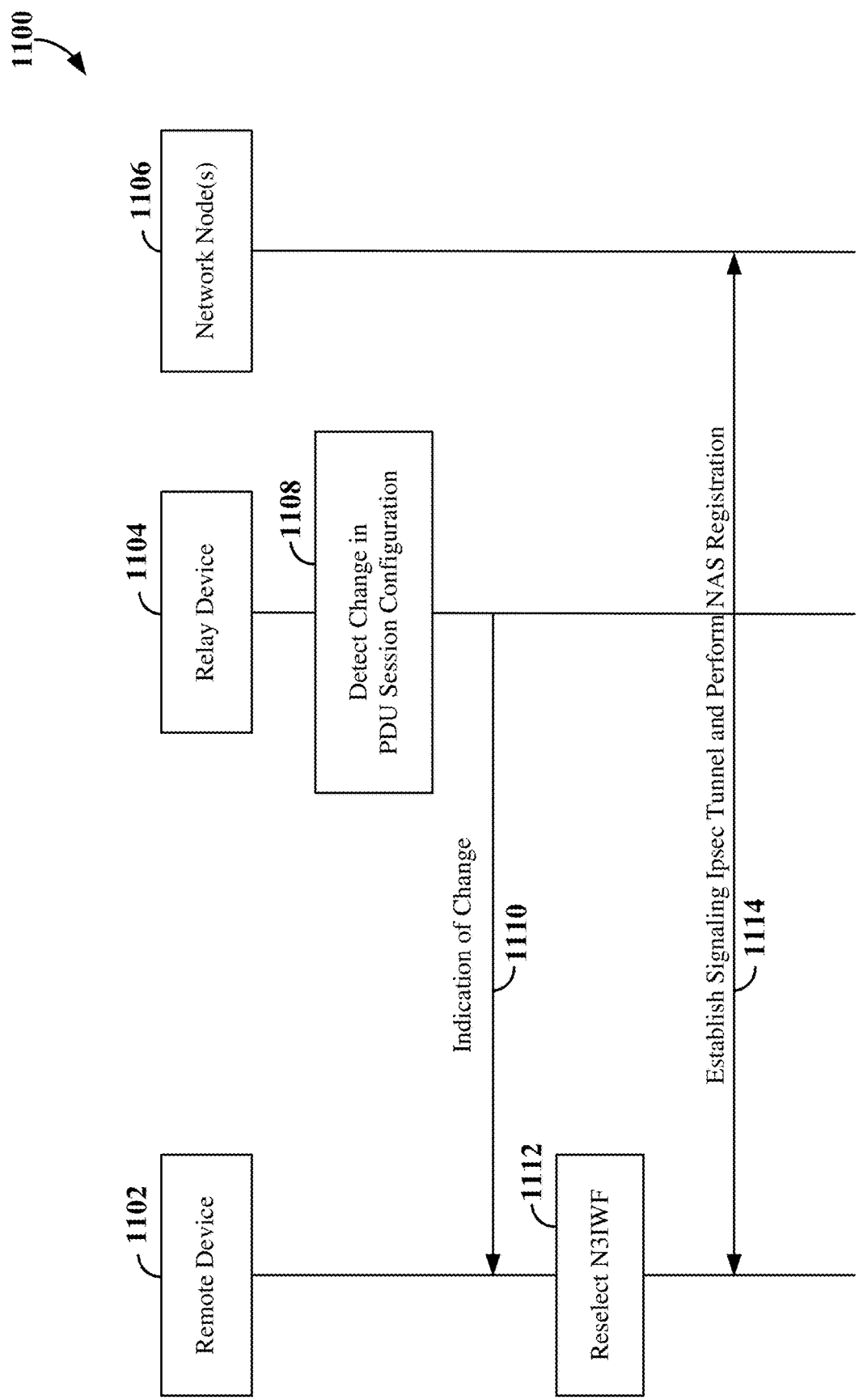
FIG. 11 is a signaling diagram illustrating an example of signaling associated with a change in a serving relay protocol data unit (PDU) session configuration according to some aspects.

FIG. 11 is a signaling diagram illustrating an example of signaling associated with a change in a serving relay PDU session configuration in a wireless communication system including a remote device 1102 (e.g., a UE), a relay device (e.g., a UE), and at least one network node 1106 according to some aspects. The remote device 1102 and the relay device 1104 may correspond to any of the UEs, sidelink devices, D2D devices, or scheduled entities shown in any of FIGS. 1, 3-10, and 12-14. The at least one network node 1106 may correspond to any of the base stations, scheduling entities, or network nodes shown in any of FIGS. 1, 3-10, and 12-13, and 16.

At 1108 of FIG. 11, the relay device 1104 may detect a change in a PDU session configuration for a PDU session that the relay device has established for the remote device 1102. For example, the relay device 1104 may detect a change in the IP address of the serving relay PDU session or a change in the PSA or UPF of the serving relay PDU session. In some examples, the relay device 1104 may receive message from the at least one network node 1106 indicating that the IP address has changed. In some examples, the relay device 1104 may receive message from the at least one network node 1106 indicating that the DNS server address has changed. In some examples, the relay device 1104 may receive message from the at least one network node 1106 indicating that there has been a change of the PSA serving the PDU session.

At 1110, the relay device 1104 transmits an indication of the change in the PDU session configuration to the remote device 1102. In some examples, the relay device 1104 transmits this indication to each remote device that is connected to the relay device 1104 for a particular RSC. In some examples, the relay device 1104 transmits this indication to each remote device that has subscribed with the relay device 1104 to receive a notification of an UPF relocation.

In some examples, the relay device 1104 may transmit the indication via a PC5 sidelink message. In some examples, the relay device 1104 may transmit the indication via a Relay Discovery Additional Information message. In some examples, the relay device 1104 may initiate a PC5 link modification procedure, a DHCP procedure, or an IPv6 SLAA procedure to transmit the indication.

At 1112, as a result of receiving the indication at 1110, the remote device 1102 selects a new N3IWF. Thus, at 1114, the remote device 1102 establishes a signaling IPsec tunnel using IKE procedures with the new N3IWF and performs a NAS registration with the network (e.g., as represented by the at least one network node 1106).

Figure 12:
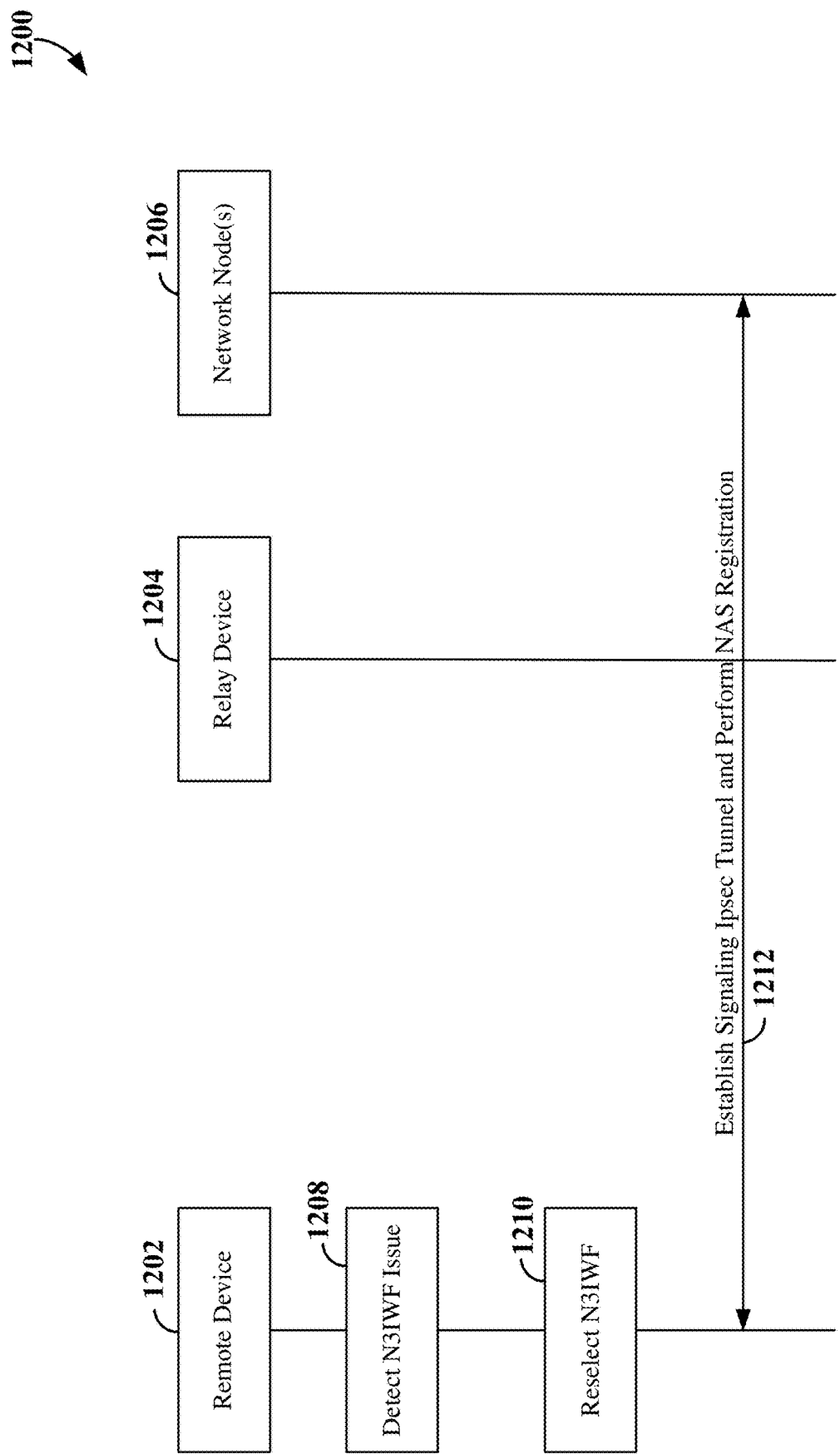
FIG. 12 is a signaling diagram illustrating an example of signaling associated with selecting an interworking function according to some aspects.

FIG. 12 is a signaling diagram illustrating an example of signaling associated with a change in a serving relay PDU session configuration in a wireless communication system including a remote device 1202 (e.g., a UE), a relay device (e.g., a UE), and at least one network node 1206 according to some aspects. The remote device 1202 and the relay device 1204 may correspond to any of the UEs, sidelink devices, D2D devices, or scheduled entities shown in any of FIGS. 1, 3-10, and 12-14. The at least one network node 1206 may correspond to any of the base stations, scheduling entities, or network nodes shown in any of FIGS. 1, 3-10, and 12-13, and 16.

At 1208 of FIG. 12, the remote device 1202 detects an issue with its current N3IWF. In some examples, the remote device 1202 receives an indication of a change in a PDU session configuration from the relay device 1204 (e.g., the indication of 1110 of FIG. 11). In some examples, the remote device 1202 determines that it is no longer able to communicate with the N3IWF.

At 1210, as a result of the detection at 1208, the remote device 1202 selects a new N3IWF. Thus, at 1212, the remote device 1102 establishes a signaling IPsec tunnel using IKE procedures with the new N3IWF and performs a NAS registration with the network (e.g., as represented by the at least one network node 1206).

Figure 13:
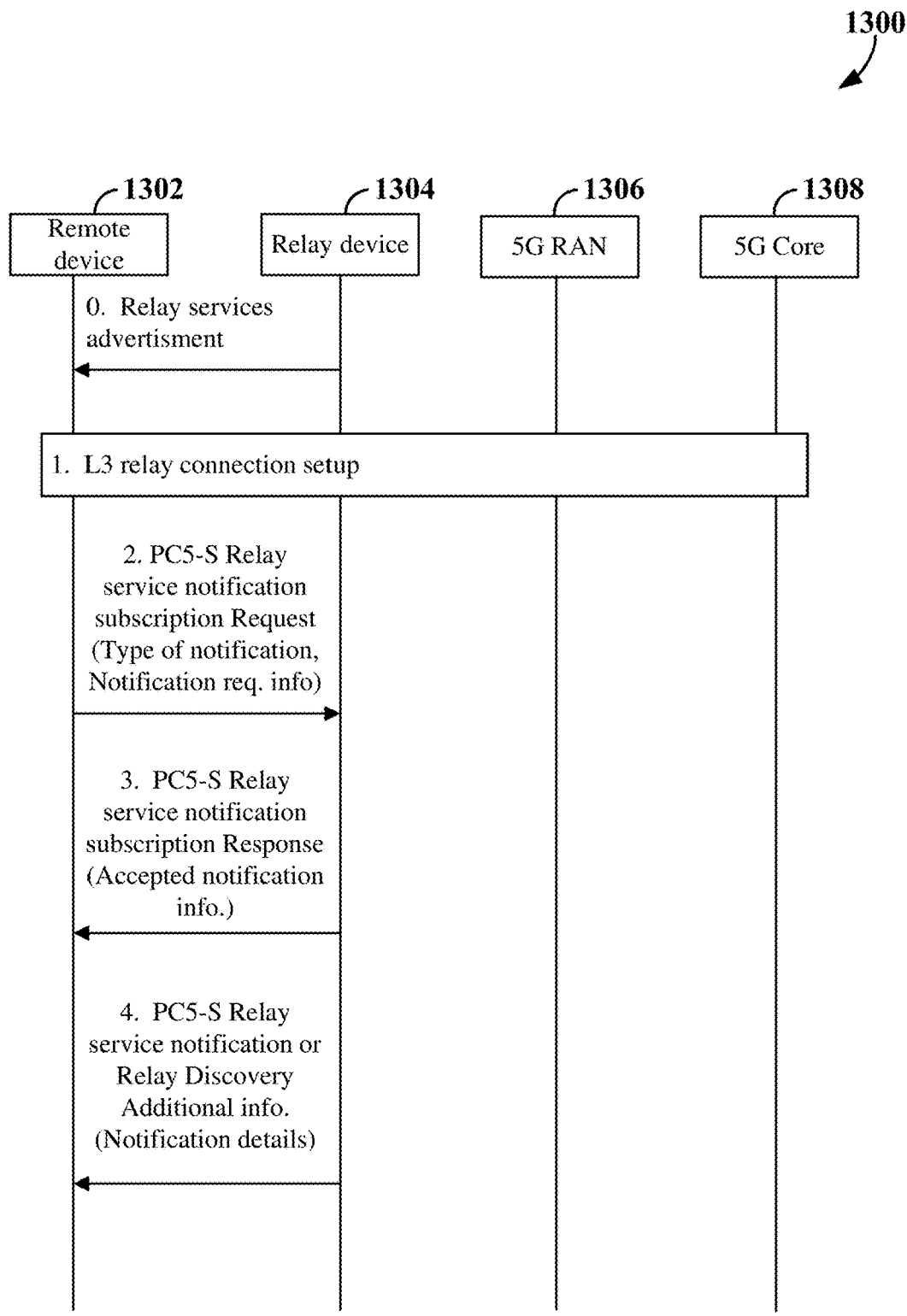
FIG. 13 is a signaling diagram illustrating an example of a relay device signaling service notifications according to some aspects.

FIG. 13 is a signaling diagram illustrating an example of signaling associated with a change in a serving relay PDU session configuration in a wireless communication system including a remote device 1302 (e.g., a UE), a relay device (e.g., a UE), at least one 5G RAN node 1306, and at least one 5G core node 1308 according to some aspects. The remote device 1302 and the relay device 1304 may correspond to any of the UEs, sidelink devices, D2D devices, or scheduled entities shown in any of FIGS. 1, 3-10, and 12-14. The at least one 5G RAN node 1306 and the at least one 5G core node 1308 may correspond to any of the base stations, scheduling entities, or network nodes shown in any of FIGS. 1, 3-10, and 12-13, and 16.

At message 0 of FIG. 13, the relay device 1304 advertises the services it supports.

At operation 1 of FIG. 13, the remote device 1302 and the relay device 1304 establish a connection whereby the relay device 1304 functions as a Layer 3 (L3) relay to enable the remote device 1302 to connect to a network (e.g., via the at least one 5G RAN node 1306 and the at least one 5G core node 1308). For example, the relay device 1304 may provide a PC5-S relay service for the remote device 1302. In some examples, this connection involves an N3IWF connection setup. In other examples, this connection does not involve an N3IWF connection setup.

At message 2 of FIG. 13, the remote device 1302 sends a request to the relay device 1304 to subscribe to one or more service notifications. In some examples, this request may indicate the type of notifications that the remote device 1302 is subscribing to receive. In some examples, this request may include notification configuration information (e.g., periodicity, event triggers, types of service).

At message 3 of FIG. 13, the relay device 1304 sends a response to the remote device 1302 indicating that the relay device 1304 has accepted the subscription request of message 2 for one or more services (e.g., one or more service events).

At optional message 4 of FIG. 13, the relay device 1304 may send additional information to the remote device 1302 relating to, for example, service notifications or relay discovery. For example, the message 4 may indicate that there has been a change in the services supported by the relay device 1304. As another example, the message 4 may indicate a change in the manner in which the relay device 1304 may be discovered by remote devices.

Figure 14:
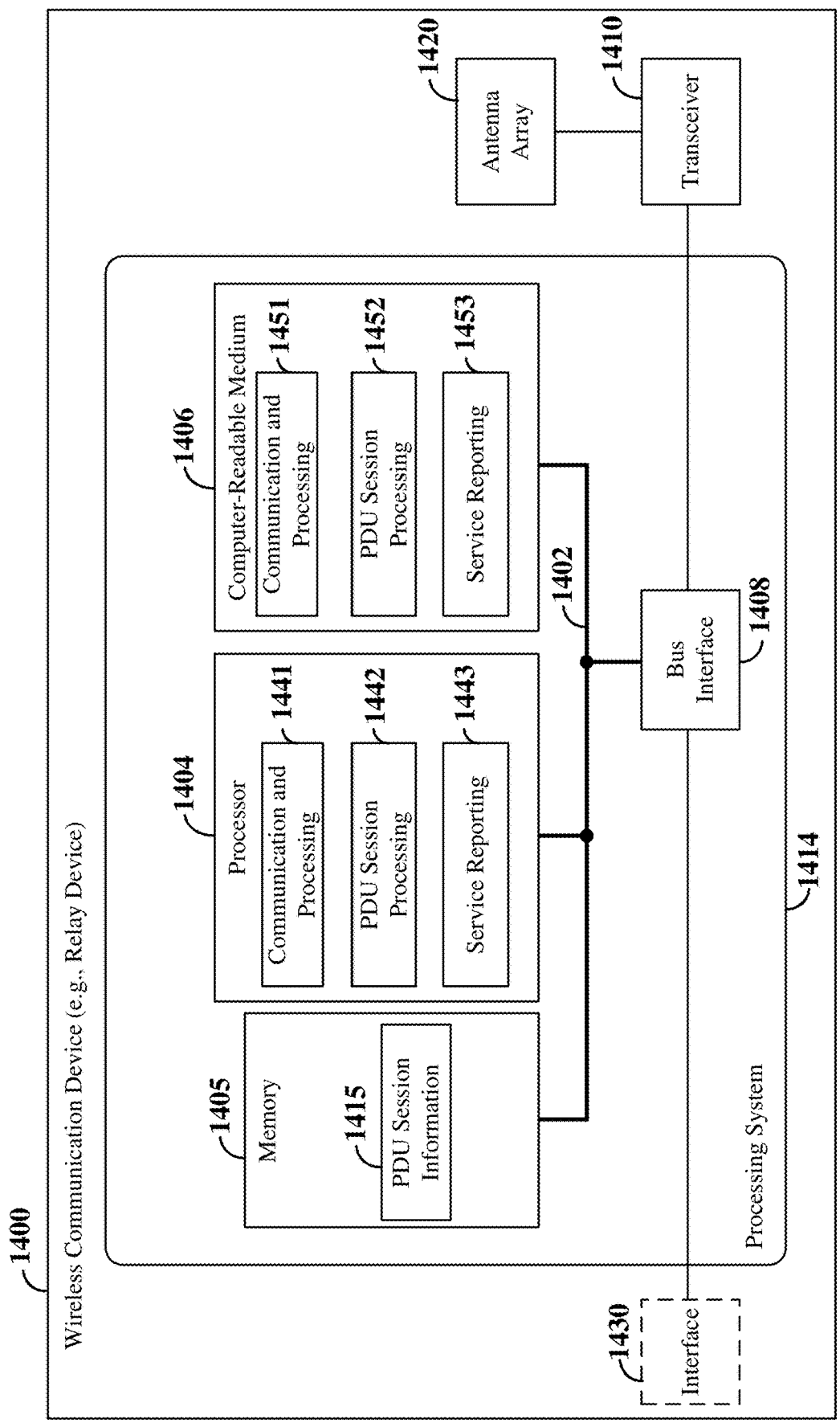
FIG. 14 is a block diagram illustrating an example of a hardware implementation for a wireless communication device employing a processing system according to some aspects.

FIG. 14 is a conceptual diagram illustrating an example of a hardware implementation for a wireless communication device 1400 employing a processing system 1414. In some examples, the wireless communication device 1400 may be a UE or scheduled entity configured to wirelessly communicate with a base station or scheduling entity, as discussed in any one or more of FIGS. 1-13. In some examples, the wireless communication device 1400 may correspond to any of the relay devices, UEs, sidelink devices, D2D devices, or scheduled entities shown in any of FIGS. 1, 3-10, and 12-13.

In accordance with various aspects of the disclosure, an element, or any portion of an element, or any combination of elements may be implemented with the processing system 1414. The processing system 1414 may include one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1400 may be configured to perform any one or more of the functions described herein. That is, the processor 1404, as utilized in a wireless communication device 1400, may be used to implement any one or more of the methods described herein.

The processor 1404 may in some instances be implemented via a baseband or modem chip and in other implementations, the processor 1404 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410 and an antenna array 1420 and between the bus 1402 and an interface 1430. The transceiver 1410 provides a means for communicating with various other apparatus over a transmission medium (e.g., air interface). The interface 1430 provides a communication interface or means of communicating with various other apparatuses and devices (e.g., other devices housed within the same apparatus as the wireless communication device 1400 or other external apparatuses) over an internal bus or external transmission medium. Depending upon the nature of the wireless communication device 1400, the interface 1430 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store PDU session information 1415 used by the processor 1404 in cooperation with the transceiver 1410 for communication operations as described herein.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. In some examples, the computer-readable medium 1406 may be part of the memory 1405. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. In some aspects, processor 1404 may include circuitry for performing one or more of the operations described herein with respect to FIGS. 6-13 and 15-16.

The processor 1404 may include communication and processing circuitry 1441, configured to communicate with a base station and one or more other wireless communication devices (e.g., a relay or remote wireless communication device) over a common carrier shared between a cellular (e.g., Uu) interface and a sidelink (e.g., PC5) interface. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). The communication and processing circuitry 1441 may further be configured to execute communication and processing software 1451 stored on the computer-readable medium 1406 to implement one or more functions described herein.

In examples where the wireless communication device 1400 is a relay wireless communication device, the communication and processing circuitry 1441 may send data received from a remote wireless communication device via a sidelink to a base station via a cellular link in accordance with a selected one of a set of data routing options.

In some implementations where the communication involves receiving information, the communication and processing circuitry 1441 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, SCIs, feedback, other information, or any combination thereof. In some examples, the communication and processing circuitry 1441 may receive information via one or more of a PSCCH, a PSSCH, a PSFCH, some other type of channel, or any combination thereof. In some examples, the communication and processing circuitry 1441 may include functionality for a means for receiving (e.g., means for receiving a signal and/or means for receiving control information). In some examples, the communication and processing circuitry 1441 may include functionality for a means for decoding.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, SCIs, feedback, other information, or any combination thereof. In some examples, the communication and processing circuitry 1441 may send information via one or more of a PSCCH, a PSSCH, a PSFCH, some other type of channel, or any combination thereof. In some examples, the communication and processing circuitry 1441 may include functionality for a means for sending (e.g., means for transmitting). In some examples, the communication and processing circuitry 1441 may include functionality for a means for encoding.

The processor 1404 may further include PDU session processing circuitry 1442, configured to perform one or more of the PDU session processing-related operations described herein (e.g., including those described in conjunction with FIGS. 11-13). The PDU session processing circuitry 1442 may be configured to execute PDU session processing software 1452 stored on the computer-readable medium 1406 to implement one or more functions described herein.

The PDU session processing circuitry 1442 may include functionality for a means for establishing a protocol data unit session for a user equipment to access an interworking function. For example, the PDU session processing circuitry 1442 may be configured to establish a PDU session that is associated with a relay service code and an N3IWF indicated by a remote user equipment that is connected to the wireless communication device 1400 for relaying operations.

The processor 1404 may further include service reporting circuitry 1443, configured to perform one or more of the service reporting-related operations described herein (e.g., including those described in conjunction with FIGS. 11-13). The service reporting circuitry 1443 may be configured to execute service reporting software 1453 stored on the computer-readable medium 1406 to implement one or more functions described herein.

The service reporting circuitry 1443 may include functionality for a means for detecting a change in a protocol data unit session configuration for a protocol data unit session. For example, the service reporting circuitry 1443 may be configured to detect one or more of: a change of an IP address associated with a serving relay PDU session, a change of a DNS server IP address associated with a serving relay PDU session, a UPF relocation event, or a combination thereof.

The service reporting circuitry 1443 may include functionality for a means for transmitting an indication of the change in the protocol data unit session configuration to a user equipment. For example, the service reporting circuitry 1443 may be configured to generate and transmit a notification message including the indication via a PC5 link.

Figure 15:
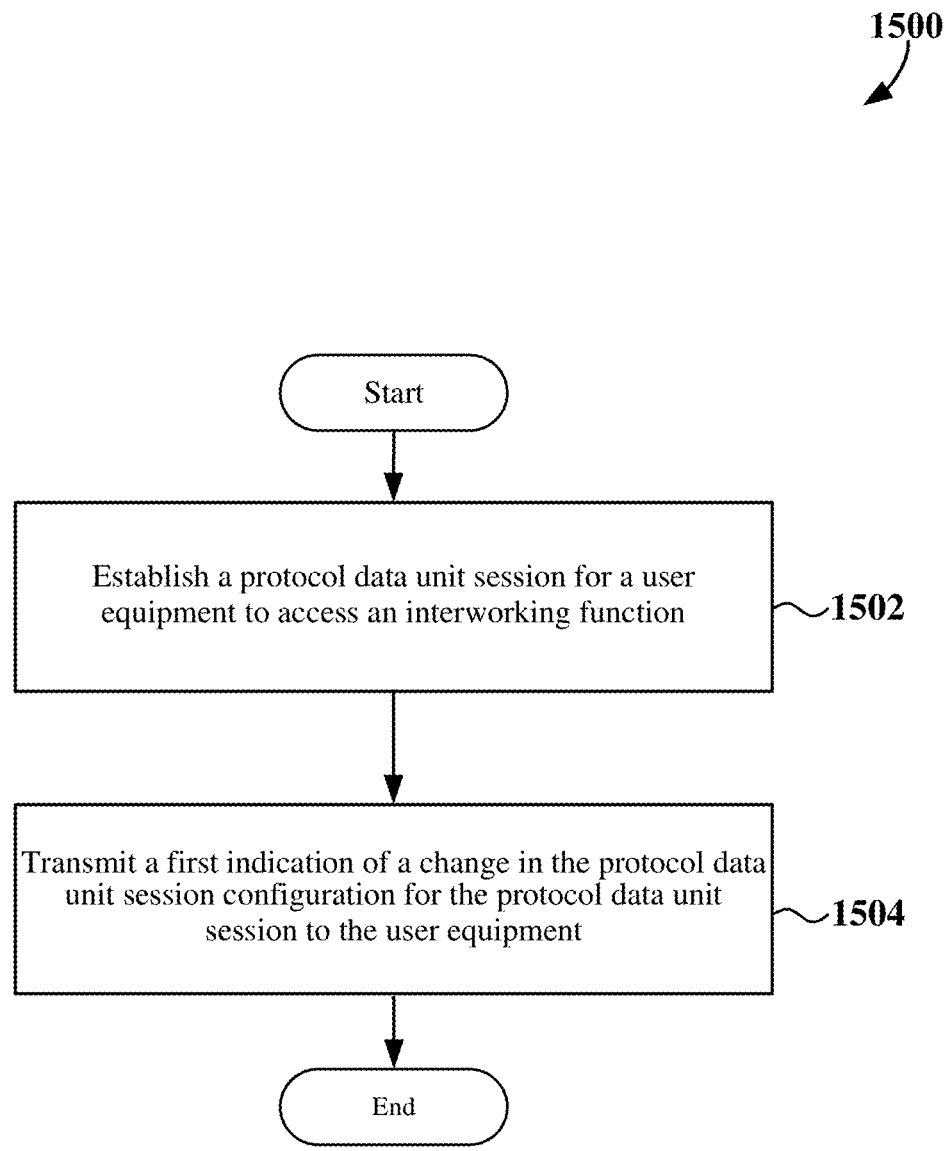
FIG. 15 is a flow chart of an example method for indicating change in a serving relay PDU session configuration according to some aspects.

FIG. 15 is a flow chart of a method 1500 for a wireless communication device according to some aspects. As described below, some or all illustrated features may be omitted in a particular implementation within the scope of the present disclosure, and some illustrated features may not be required for implementation of all examples. In some examples, the method 1500 may be performed by the wireless communication device 1400 (e.g., performed by the processing system 1414), as described above and illustrated in FIG. 14, by a processor or processing system, or by any suitable means for carrying out the described functions.

At block 1502, a wireless communication device may establish a protocol data unit session for a user equipment to access an interworking function. For example, the PDU session processing circuitry 1442 in cooperation with the communication and processing circuitry 1441 and the transceiver 1410, shown and described above in connection with FIG. 14, may provide a means to establish a protocol data unit session for a user equipment to access an interworking function. In some examples, the interworking function may include a non-3rd Generation Partnership Project interworking function.

At block 1504, the wireless communication device may transmit a first indication of a change in a protocol data unit session configuration for the protocol data unit session to the user equipment. For example, the service reporting circuitry 1443 in cooperation with the communication and processing circuitry 1441 and the transceiver 1410 may provide a means to transmit a first indication of a change in a protocol data unit session configuration for the protocol data unit session to the user equipment.

The change in the protocol data unit session configuration may take different forms in different examples. In some examples, the change in the protocol data unit session configuration may include a change in an Internet Protocol address associated with the protocol data unit session. In some examples, the change in the protocol data unit session configuration may include a change in a domain name system server address associated with the protocol data unit session. In some examples, the change in the protocol data unit session configuration may include a change in a user plane function associated with the protocol data unit session. In some examples, the change in a user plane function may include a change in a location of a session anchor serving the protocol data unit session.

In some examples, the wireless communication device may transmit the first indication to each user equipment that is connected to the wireless communication device for a particular relay service code. In some examples, the wireless communication device may transmit the first indication to each user equipment that is subscribed with the wireless communication device to receive user plane function relocation notifications. In some examples, the wireless communication device may transmit the first indication via a PC5 sidelink message. In some examples, the wireless communication device may transmit the first indication via a Relay Discovery Additional Information message.

In some examples, the wireless communication device may transmit a second indication of services supported by the wireless communication device for relay operations. In some examples, the wireless communication device may receive a request from at least one user equipment for notification of service events associated with at least one of the services. In some examples, the wireless communication device may detect at least one of the service events and transmit a third indication of the at least one of the service events to the at least one user equipment. In some examples, the service events may include at least one of cell information associated with the wireless communication device, location information associated with the wireless communication device, user plane function relocation information associated with the wireless communication device, multicast and broadcast system services supported by the wireless communication device, or a combination thereof.

In some examples, the wireless communication device may transmit a third indication of at least one of the services that is not currently supported by the wireless communication device. In some examples, the wireless communication device may transmit a second indication of service notifications supported by the wireless communication device for relay operations. In some examples, the wireless communication device may transmit a second indication of service notifications that are autonomously transmitted by the wireless communication device.

In one configuration, the wireless communication device 1400 includes means for establishing a protocol data unit session for a user equipment to access an interworking function, means for detecting a change in a protocol data unit session configuration for the protocol data unit session, and means for transmitting a first indication of the change in the protocol data unit session configuration to the user equipment. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1 and 3-14, and utilizing, for example, the methods and/or algorithms described herein in relation to FIG. 15.

Figure 16:
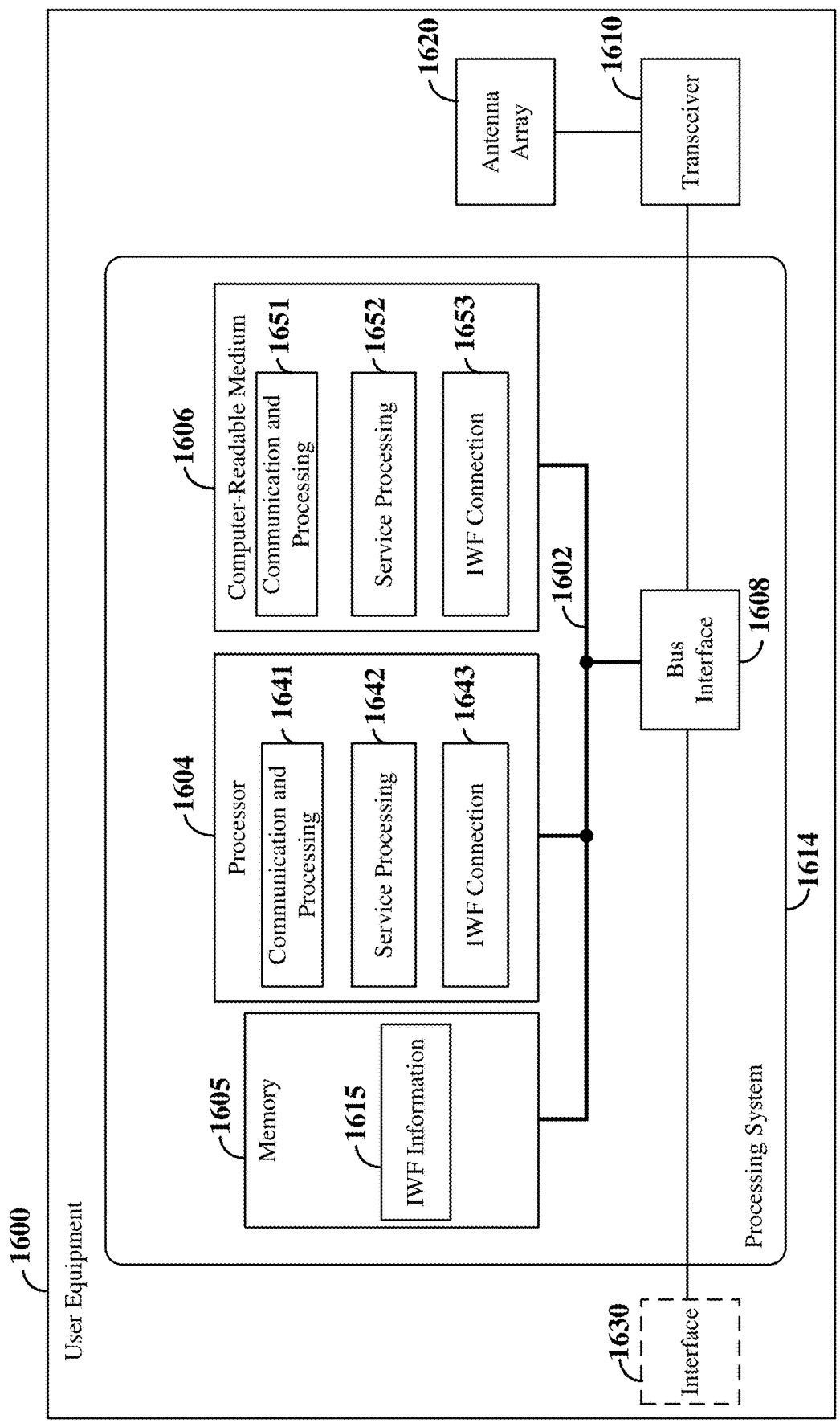
FIG. 16 is a block diagram illustrating an example of a hardware implementation for a user equipment employing a processing system according to some aspects.

FIG. 16 is a block diagram illustrating an example of a hardware implementation for a user equipment (UE) 1600 employing a processing system 1614. In some examples, the UE 1600 may be a UE or scheduled entity configured to wirelessly communicate with a base station or scheduling entity, as discussed in any one or more of FIGS. 1-13. In some examples, the UE 1600 may correspond to any of the remote devices, UEs, sidelink devices, D2D devices, or scheduled entities shown in any of FIGS. 1, 3-10, and 12-13.

In accordance with various aspects of the disclosure, an element, or any portion of an element, or any combination of elements may be implemented with the processing system 1614. The processing system may include one or more processors 1604. The processing system 1614 may be substantially the same as the processing system 1414 illustrated in FIG. 14, including a bus interface 1608, a bus 1602, memory 1605, a processor 1604, a computer-readable medium 1606, a transceiver 1610, and an antenna array 1620. The memory 1605 may store interworking function (IWF) information 1615 (e.g., an IP address, etc.) used by the processor 1604 in cooperation with the transceiver 1610 for the communication operations described herein. Furthermore, the UE 1600 may include an interface 1630 that provides a means for communicating with at least one other apparatus within a core network and with at least one radio access network.

The UE 1600 may be configured to perform any one or more of the operations described herein (e.g., as described above in conjunction with FIGS. 1-13 and as described below in conjunction with FIG. 17). In some aspects of the disclosure, the processor 1604, as utilized in the UE 1600, may include circuitry configured for various functions.

In some aspects of the disclosure, the processor 1604 may include communication and processing circuitry 1641. The communication and processing circuitry 1644 may be configured to communicate with a UE. The communication and processing circuitry 1641 may include one or more hardware components that provide the physical structure that performs various processes related to communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission)

as described herein. The communication and processing circuitry 1641 may further be configured to execute communication and processing software 1651 included on the computer-readable medium 1606 to implement one or more functions described herein.

In examples, where the user equipment 1600 is a remote wireless communication device, the communication and processing circuitry 1641 may send data to a relay wireless communication device via a sidelink in accordance with a selected one of a set of data routing options.

In some implementations wherein the communication involves receiving information, the communication and processing circuitry 1641 may obtain information from a component of the UE 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

The processor 1604 may further include service processing circuitry 1642, configured to perform one or more of the service processing-related operations described herein (e.g., including those described in conjunction with FIGS. 11-13). The service processing circuitry 1642 may be configured to execute service processing software 1652 stored on the computer-readable medium 1606 to implement one or more functions described herein.

The service processing circuitry 1642 may include functionality for a means for detecting a change in a protocol data unit session configuration for the protocol data unit session. For example, the service processing circuitry 1642 may be configured to receive a parse a message from a relay that indicates the change in a PDU session configuration that is being used for relaying operations associated with an N3IWF for the user equipment.

The processor 1604 may further include IWF connection circuitry 1643, configured to perform one or more of the IWF connection-related operations described herein (e.g., including those described in conjunction with FIGS. 11-13). The IWF connection circuitry 1643 may be configured to execute IWF connection software 1653 stored on the computer-readable medium 1606 to implement one or more functions described herein.

The IWF connection circuitry 1643 may include functionality for a means for selecting an interworking function. For example, the IWF connection circuitry 1643 may be configured to determine the IP address of an N3IWF that is reachable by the user equipment.

The IWF connection circuitry 1643 may include functionality for a means for connecting to an interworking function. For example, the IWF connection circuitry 1643 may be configured to signal to a relay device via PC5 link an IP address of an N3IWF that has been selected by the user equipment.

Figure 17:
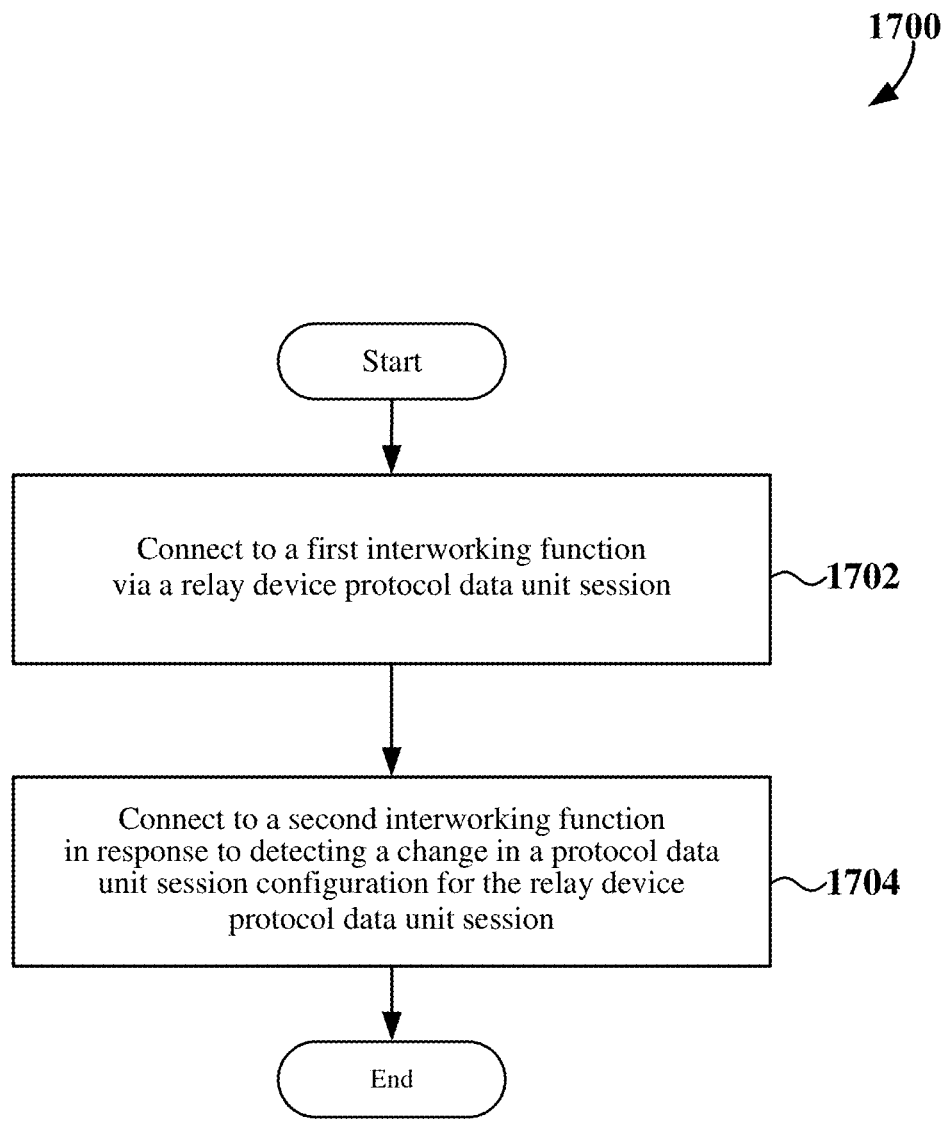
FIG. 17 is a flow chart of an example method for selecting an interworking function according to some aspects.

FIG. 17 is a flow chart of a method 1700 for a user equipment according to some aspects. As described below, some or all illustrated features may be omitted in a particular implementation within the scope of the present disclosure, and some illustrated features may not be required for implementation of all examples. In some examples, the method 1700 may be performed by the user equipment 1600 (e.g., performed by the processing system 1614), as described above and illustrated in FIG. 16, by a processor or processing system, or by any suitable means for carrying out the described functions.

At block 1702, a user equipment may connect to a first interworking function via a relay device protocol data unit session. For example, the IWF connection circuitry 1643 in cooperation with the communication and processing circuitry 1641 and the transceiver 1610, shown and described above in connection with FIG. 16, may provide a means to connect to a first interworking function via a relay device protocol data unit session. In some examples, the first interworking function may include a non-3rd Generation Partnership Project interworking function.

At block 1704, the user equipment may connect to a second interworking function in response to a detection of a change in a protocol data unit session configuration for the relay device protocol data unit session. For example, the IWF connection circuitry 1643 in cooperation with the service processing circuitry 1642 and the communication and processing circuitry 1641 and the transceiver 1610 may provide a means to connect to a second interworking function in response to a detection of a change in a protocol data unit session configuration for the relay device protocol data unit session. In some examples, the second interworking function may include a non-3rd Generation Partnership Project interworking function.

The change in the protocol data unit session configuration may take different forms in different examples. In some examples, the change in the protocol data unit session configuration may include a change in an Internet Protocol address associated with the protocol data unit session. In some examples, the change in the protocol data unit session configuration may include a change in a domain name system server address associated with the protocol data unit session. In some examples, the change in the protocol data unit session configuration may include a change in a user plane function associated with the protocol data unit session. In some examples, the change in a user plane function may include a change in a location of a session anchor serving the protocol data unit session.

In some examples, the user equipment may receive a first indication of the change in the protocol data unit session configuration from a relay device. In some examples, the user equipment may connect to the relay device for a particular relay service code and receive the first indication after connecting to the relay device for the particular relay service code. In some examples, the user equipment may subscribe with the relay device to receive user plane function relocation notifications and receive the first indication after subscribing with the relay device to receive user plane function relocation notifications.

In some examples, the user equipment may receive a first indication of services supported by a relay device. In some examples, the user equipment may transmit a request to the relay device for notification of service events associated with at least one of the services. In some examples, the request indicates at least one of a type of notification, notification configuration information, notification timing information, notification trigger information, or a combination thereof. In some examples, the user equipment may receive a second indication of the at least one of the service events from the relay device and select a third interworking function after receiving the second indication. In some examples, the service events may include at least one of cell information associated with the relay device, location information associated with the relay device, user plane function relocation information associated with the relay device, multi-cast and broadcast system services supported by the relay device, or a combination thereof.

In one configuration, the user equipment 1600 includes means for connecting to a first interworking function via a relay device protocol data unit session, means for detecting a change in a protocol data unit session configuration for the protocol data unit session, means for selecting a second interworking function after the detecting the change in the protocol data unit session configuration, and means for connecting to the second interworking function. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 3-13, and 16, and utilizing, for example, the methods and/or algorithms described herein in relation to FIG. 17.

The methods shown in FIGS. 15 and 17 may include additional aspects, such as any single aspect or any combination of aspects described below and/or in connection with one or more other processes described elsewhere herein. The following provides an overview of several aspects of the present disclosure.

Aspect 1: A method for wireless communication at a wireless communication relay device, the method comprising: establishing a protocol data unit session for a user equipment to access an interworking function; and transmitting a first indication of a change in a protocol data unit session configuration for the protocol data unit session to the user equipment.

Aspect 2: The method of aspect 1, wherein the interworking function comprises a non-$3^{rd}$ Generation Partnership Project interworking function.

Aspect 3: The method of aspect 1 or 2, wherein the change in the protocol data unit session configuration comprises a change in an Internet Protocol address associated with the protocol data unit session.

Aspect 4: The method of any of aspects 1 through 3, wherein the change in the protocol data unit session configuration comprises a change in a domain name system server address associated with the protocol data unit session.

Aspect 5: The method of any of aspects 1 through 4, wherein the change in the protocol data unit session configuration comprises a change in a user plane function associated with the protocol data unit session.

Aspect 6: The method of aspect 5, wherein the change in the user plane function comprises a change in a location of a session anchor serving the protocol data unit session.

Aspect 7: The method of any of aspects 1 through 6, further comprising: transmitting the first indication to each user equipment that is connected to the wireless communication relay device for a relay service code.

Aspect 8: The method of any of aspects 1 through 7, further comprising: transmitting the first indication to each user equipment that is subscribed with the wireless communication relay device to receive user plane function relocation notifications.

Aspect 9: The method of any of aspects 1 through 8, further comprising: transmitting the first indication via a PC5 sidelink message.

Aspect 10: The method of any of aspects 1 through 9, further comprising: transmitting the first indication via a Relay Discovery Additional Information message.

Aspect 11: The method of any of aspects 1 through 10, further comprising: transmitting a second indication of services supported by the wireless communication relay device for relay operations.

Aspect 12: The method of aspect 11, further comprising: receiving a request from at least one user equipment for notification of service events associated with at least one of the services.

Aspect 13: The method of aspect 12, further comprising: detecting at least one of the service events; and transmitting a third indication of the at least one of the service events to the at least one user equipment.

Aspect 14: The method of any of aspects 12 through 13, wherein the service events comprise at least one of: cell information associated with the wireless communication relay device, location information associated with the wireless communication relay device, user plane function relocation information associated with the wireless communication relay device, multi-cast and broadcast system services supported by the wireless communication relay device, or a combination thereof.

Aspect 15: The method of any of aspects 11 through 14, further comprising: transmitting a third indication of at least one service that is not currently supported by the wireless communication relay device.

Aspect 16: The method of any of aspects 1 through 15, further comprising: transmitting a second indication of service notifications supported by the wireless communication relay device for relay operations.

Aspect 17: The method of any of aspects 1 through 16, further comprising: transmitting a second indication of service notifications that are autonomously transmitted by the wireless communication relay device.

Aspect 19: A method for wireless communication at a user equipment, the method comprising: connecting to a first interworking function via a relay device protocol data unit session; and connecting to a second interworking function in response to detecting a change in a protocol data unit session configuration for the relay device protocol data unit session.

Aspect 20: The method of aspect 19, wherein the first interworking function and the second interworking function comprise non-3$^{rd}$ Generation Partnership Project interworking functions.

Aspect 21: The method of any of aspects 19 through 20, wherein the change in the protocol data unit session configuration comprises a change in an Internet Protocol address associated with the relay device protocol data unit session, a change in a domain name system server address associated with the relay device protocol data unit session, a change in a user plane function associated with the relay device protocol data unit session, or a change in a location of a session anchor serving the relay device protocol data unit session.

Aspect 22: The method of any of aspects 19 through 21, further comprising: receiving a first indication of the change in the protocol data unit session configuration from a relay device.

Aspect 23: The method of aspect 22, further comprising: receiving the first indication after connecting to the relay device for a particular relay service code.

Aspect 24: The method of any of aspects 22 through 23, further comprising: receiving the first indication after subscribing with the relay device to receive user plane function relocation notifications.

Aspect 25: The method of any of aspects 19 through 24, further comprising: receiving a first indication of services supported by a relay device.

Aspect 26: The method of aspect 25, further comprising: transmitting a request to the relay device for notification of service events associated with at least one of the services.

Aspect 27: The method of aspect 26, wherein the request indicates at least one of: a type of notification, notification configuration information, notification timing information, notification trigger information, or a combination thereof.

Aspect 28: The method of any of aspects 26 through 27, further comprising: receiving a second indication of the at least one of the service events from the relay device; and selecting a third interworking function after receiving the second indication.

Aspect 29: The method of any of aspects 26 through 28, wherein the service events comprise at least one of: cell information associated with the relay device, location information associated with the relay device, user plane function relocation information associated with the relay device, multi-cast and broadcast system services supported by the relay device, or a combination thereof.

Aspect 30: A wireless communication relay device comprising: a transceiver configured to communicate with a radio access network, a memory, and a processor communicatively coupled to the transceiver and the memory, wherein the processor and the memory are configured to perform any one of aspects 1 through 17.

Aspect 31: An apparatus configured for wireless communication comprising at least one means for performing any one of aspects 1 through 17.

Aspect 32: A non-transitory computer-readable medium storing computer-executable code, comprising code for causing an apparatus to perform any one of aspects 1 through 17.

Aspect 33: A user equipment comprising: a transceiver, a memory, and a processor communicatively coupled to the transceiver and the memory, wherein the processor and the memory are configured to perform any one of aspects 19 through 29.

Aspect 34: An apparatus configured for wireless communication comprising at least one means for performing any one of aspects 19 through 29.

Aspect 35: A non-transitory computer-readable medium storing computer-executable code, comprising code for causing an apparatus to perform any one of aspects 19 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-14, and 16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication relay device, comprising:
    a transceiver;
    a memory; and
    a processor coupled to the transceiver and the memory, wherein the processor and the memory are configured to:
        establish a protocol data unit session for a user equipment to access an interworking function via the transceiver; and
        transmit a first indication of a change in a protocol data unit session configuration for the protocol data unit session to the user equipment and to each user equipment that is subscribed with the wireless communication relay device to receive user plane function relocation notifications via the transceiver.

2. The wireless communication relay device of claim 1, wherein the interworking function comprises a non-3$^{rd}$ Generation Partnership Project interworking function.

3. The wireless communication relay device of claim 1, wherein the change in the protocol data unit session configuration comprises a change in an Internet Protocol address associated with the protocol data unit session.

4. The wireless communication relay device of claim 1, wherein the change in the protocol data unit session configuration comprises a change in a domain name system server address associated with the protocol data unit session.

5. The wireless communication relay device of claim 1, wherein the change in the protocol data unit session configuration comprises a change in a user plane function associated with the protocol data unit session.

6. The wireless communication relay device of claim 5, wherein the change in the user plane function comprises a change in a location of a session anchor serving the protocol data unit session.

7. The wireless communication relay device of claim 1, wherein the processor and the memory are further configured to:
    transmit the first indication via a PC5 sidelink message.

8. The wireless communication relay device of claim 1, wherein the processor and the memory are further configured to:
    transmit the first indication via a Relay Discovery Additional Information message.

9. The wireless communication relay device of claim 1, wherein the processor and the memory are further configured to:
    transmit a second indication of services supported by the wireless communication relay device for relay operations.

10. The wireless communication relay device of claim 9, wherein the processor and the memory are further configured to:
    receive a request from at least one user equipment for notification of service events associated with at least one of the services.

11. The wireless communication relay device of claim 10, wherein the processor and the memory are further configured to:
    detect at least one of the service events; and
    transmit a third indication of the at least one of the service events to the at least one user equipment.

12. The wireless communication relay device of claim 10, wherein the service events comprise at least one of: cell information associated with the wireless communication relay device, location information associated with the wireless communication relay device, user plane function relocation information associated with the wireless communication relay device, multi-cast and broadcast system services supported by the wireless communication relay device, or a combination thereof.

13. The wireless communication relay device of claim 9, wherein the processor and the memory are further configured to:
    transmit a third indication of at least one service that is not currently supported by the wireless communication relay device.

14. The wireless communication relay device of claim 1, wherein the processor and the memory are further configured to:
    transmit a second indication of service notifications supported by the wireless communication relay device for relay operations.

15. The wireless communication relay device of claim 1, wherein the processor and the memory are further configured to:
    transmit a second indication of service notifications that are autonomously transmitted by the wireless communication relay device.

16. A method for wireless communication at a wireless communication relay device, the method comprising:
    establishing a protocol data unit session for a user equipment to access an interworking function; and
    transmitting a first indication of a change in a protocol data unit session configuration for the protocol data unit session to the user equipment and to each user equipment that is subscribed with the wireless communication relay device to receive user plane function relocation notifications.

17. The method of claim 16, wherein the interworking function comprises a non-3$^{rd}$ Generation Partnership Project interworking function.

18. The method of claim 16, wherein the change in the protocol data unit session configuration comprises a change in an Internet Protocol address associated with the protocol data unit session.

19. The method of claim 16, wherein the change in the protocol data unit session configuration comprises a change in a domain name system server address associated with the protocol data unit session.

20. The method of claim 16, wherein the change in the protocol data unit session configuration comprises a change in a user plane function associated with the protocol data unit session.

21. The method of claim 20, wherein the change in the user plane function comprises a change in a location of a session anchor serving the protocol data unit session.

22. The method of claim 16, and further comprising:
transmitting the first indication via a PC5 sidelink message.

23. The method of claim 16, and further comprising:
transmitting the first indication via a Relay Discovery Additional Information message.

24. The method of claim 16, and further comprising:
transmitting a second indication of services supported by the wireless communication relay device for relay operations.

25. The method of claim 24, and further comprising:
receiving a request from at least one user equipment for notification of service events associated with at least one of the services.

26. The method of claim 25, and further comprising:
detecting at least one of the service events; and
transmitting a third indication of the at least one of the service events to the at least one user equipment.

27. The method of claim 25, wherein the service events comprise at least one of: cell information associated with the wireless communication relay device, location information associated with the wireless communication relay device, user plane function relocation information associated with the wireless communication relay device, multi-cast and broadcast system services supported by the wireless communication relay device, or a combination thereof.

28. The method of claim 24, and further comprising:
transmit a third indication of at least one service that is not currently supported by the wireless communication relay device.

29. The method of claim 18, and further comprising:
transmitting a second indication of service notifications supported by the wireless communication relay device for relay operations.

30. The method of claim 18, and further comprising:
transmitting a second indication of service notifications that are autonomously transmitted by the wireless communication relay device.

31. A user equipment, comprising:
a transceiver;
a memory; and
a processor coupled to the transceiver and the memory, wherein the processor and the memory are configured to:
connect via the transceiver to a first interworking function via a relay device protocol data unit session;
subscribe with the relay device to receive user plane function relocation notifications;
receive, from the relay device, a first indication of a change in a protocol data unit session configuration for the relay device protocol data unit session; and
connect via the transceiver to a second interworking function in response to the change in a protocol data unit session configuration for the relay device protocol data unit session.

32. The user equipment of claim 31, wherein the first interworking function and the second interworking function comprise non-3$^{rd}$ Generation Partnership Project interworking functions.

33. The user equipment of claim 31, wherein the change in the protocol data unit session configuration comprises a change in an Internet Protocol address associated with the relay device protocol data unit session, a change in a domain name system server address associated with the relay device protocol data unit session, a change in a user plane function associated with the relay device protocol data unit session, or a change in a location of a session anchor serving the relay device protocol data unit session.

34. The user equipment of claim 19, wherein the processor and the memory are further configured to:
receive a first indication of services supported by a relay device.

35. The user equipment of claim 25, wherein the processor and the memory are further configured to:
transmit a request to the relay device for notification of service events associated with at least one of the services.

36. The user equipment of claim 35, wherein the request indicates at least one of: a type of notification, notification configuration information, notification timing information, notification trigger information, or a combination thereof.

37. The user equipment of claim 35, wherein the processor and the memory are further configured to:
receive a second indication of the at least one of the service events from the relay device; and
select a third interworking function after receiving the second indication.

38. The user equipment of claim 35, wherein the service events comprise at least one of: cell information associated with the relay device, location information associated with the relay device, user plane function relocation information associated with the relay device, multi-cast and broadcast system services supported by the relay device, or a combination thereof.

39. A method for wireless communication at a user equipment, the method comprising:
connecting to a first interworking function via a relay device protocol data unit session;
subscribing with the relay device to receive user plane function relocation notifications;
receiving, from the relay device, a first indication of a change in a protocol data unit session configuration for the relay device protocol data unit session; and
connecting to a second interworking function in response to the change in a protocol data unit session configuration for the relay device protocol data unit session.

40. The method of claim 39, wherein the first interworking function and the second interworking function comprise non-3$^{rd}$ Generation Partnership Project interworking functions.

41. The method of claim 39, wherein the change in the protocol data unit session configuration comprises a change in an Internet Protocol address associated with the relay device protocol data unit session, a change in a domain name system server address associated with the relay device protocol data unit session, a change in a user plane function associated with the relay device protocol data unit session, or a change in a location of a session anchor serving the relay device protocol data unit session.

42. The method of claim 39, and further comprising:
receiving a first indication of services supported by a relay device.

43. The method of claim 42, and further comprising:
transmitting a request to the relay device for notification of service events associated with at least one of the services.

44. The method of claim 43, wherein the request indicates at least one of: a type of notification, notification configuration information, notification timing information, notification trigger information, or a combination thereof.

45. The method of claim 43, and further comprising:
receiving a second indication of the at least one of the service events from the relay device; and
selecting a third interworking function after receiving the second indication.

46. The method of claim 43, wherein the service events comprise at least one of: cell information associated with the relay device, location information associated with the relay device, user plane function relocation information associated with the relay device, multi-cast and broadcast system services supported by the relay device, or a combination thereof.

* * * * *